(12) United States Patent
Ford

(10) Patent No.: US 10,834,097 B2
(45) Date of Patent: Nov. 10, 2020

(54) ADAPTIVE TRUST PROFILE COMPONENTS

(71) Applicant: Forcepoint LLC, Austin, TX (US)

(72) Inventor: Richard A. Ford, Austin, TX (US)

(73) Assignee: Forcepoint, LLC, Austin, TX (US)

( * ) Notice: Subject to any disclaimer, the term of this patent is extended or adjusted under 35 U.S.C. 154(b) by 0 days.

(21) Appl. No.: 16/415,726

(22) Filed: May 17, 2019

(65) Prior Publication Data
US 2020/0112576 A1 Apr. 9, 2020

Related U.S. Application Data

(63) Continuation of application No. 16/162,655, filed on Oct. 17, 2018, now Pat. No. 10,530,786, which is a
(Continued)

(51) Int. Cl.
*H04L 29/06* (2006.01)
*G06N 5/04* (2006.01)
(Continued)

(52) U.S. Cl.
CPC ............ *H04L 63/14* (2013.01); *G06F 21/554* (2013.01); *G06F 21/57* (2013.01); *G06F 21/604* (2013.01); *G06F 21/6218* (2013.01); *G06N 5/04* (2013.01); *H04L 9/3239* (2013.01); *H04L 63/102* (2013.01); *H04L 63/1408* (2013.01);
(Continued)

(58) Field of Classification Search
CPC ... H04L 63/14; H04L 63/205; H04L 63/1425; H04L 63/102; H04L 67/306; H04L 67/22; H04L 9/3239; H04L 63/1408; H04L 2209/38; G06N 5/04; G06F 21/6218;
(Continued)

(56) References Cited

U.S. PATENT DOCUMENTS 7,395,201 B2 7/2008 Shaw
7,506,371 B1 * 3/2009 Ben-Natan ............ G06F 21/316
726/18

(Continued)

OTHER PUBLICATIONS symantec.com, Which tuning is available for improving the performance of Symantec Endpoint Protection clients during scan, https://support.symantec.com/en_US/article.TECH143941.html, Jan. 6, 2011.
(Continued)

*Primary Examiner* — Darren B Schwartz
(74) *Attorney, Agent, or Firm* — Terrile, Cannatti & Chambers; Stephen A. Terrile

(57) ABSTRACT

A system, method, and computer-readable medium are disclosed for generating an adaptive trust profile via an adaptive trust profile operation. In various embodiments the adaptive trust profile operation includes: monitoring a plurality of electronically-observable actions of an entity, the plurality of electronically-observable actions of the entity corresponding to a plurality of respective events enacted by the entity; converting the plurality of electronically-observable actions of the entity to electronic information representing the plurality of actions of the entity; and generating the adaptive trust profile based upon the plurality of actions of the entity, the adaptive trust profile comprising a plurality of adaptive trust profile components.

20 Claims, 15 Drawing Sheets

| Adaptive Trust Profile 640 ||||
|---|---|---|---|
| Entity State 638 | Entity Attributes 1004 | Behavioral Models 1006 | Inferences 1008 |
| • Short-term<br>- The world as it is now<br>• Long-term<br>- Persistent or recurring | • Long-lived<br>- Machine name, GUID, MAC address | • Slowly evolving<br>- Provide Insight into how unexpected a set of events is | • Slowly-evolving<br>- "This account is compromised"<br>- "Eve will leave the company" |

Related U.S. Application Data continuation of application No. 15/963,729, filed on Apr. 26, 2018, now Pat. No. 10,129,269, which is a continuation-in-part of application No. 15/878,898, filed on Jan. 24, 2018, now Pat. No. 10,063,568, which is a continuation of application No. 15/720,788, filed on Sep. 29, 2017, now Pat. No. 9,882,918.

(60) Provisional application No. 62/839,060, filed on Apr. 26, 2019, provisional application No. 62/506,300, filed on May 15, 2017.

(51) Int. Cl.
   *G06F 21/62* (2013.01)
   *G06F 21/57* (2013.01)
   *H04L 29/08* (2006.01)
   *G06F 21/60* (2013.01)
   *G06F 21/55* (2013.01)
   *H04L 9/32* (2006.01)

(52) U.S. Cl.
   CPC ........ *H04L 63/1425* (2013.01); *H04L 63/205* (2013.01); *H04L 67/22* (2013.01); *H04L 67/306* (2013.01); *G06F 2221/2101* (2013.01); *G06F 2221/2141* (2013.01); *H04L 2209/38* (2013.01)

(58) Field of Classification Search
   CPC ...... G06F 21/57; G06F 21/604; G06F 21/554; G06F 2221/2101; G06F 2221/2141
   See application file for complete search history.

(56) References Cited

U.S. PATENT DOCUMENTS

| | | |
|---|---|---|
| 7,895,448 B1 | 2/2011 | Satish |
| 8,122,122 B1 | 2/2012 | Clingenpeel et al. |
| 8,176,159 B2 | 5/2012 | Kashi |
| 8,549,629 B1 | 10/2013 | McCreesh et al. |
| 8,613,108 B1 | 12/2013 | Aggarwal |
| 8,640,231 B2 | 1/2014 | Florencio et al. |
| 8,775,162 B2 | 7/2014 | Shaw |
| 8,918,903 B1 | 12/2014 | Schepis et al. |
| 8,963,806 B1 | 2/2015 | Starner et al. |
| 8,966,036 B1* | 2/2015 | Asgekar ................ G06Q 50/01 707/706 |
| 9,130,986 B2 | 9/2015 | Troyansky |
| 9,224,008 B1 | 12/2015 | De et al. |
| 9,246,944 B1 | 1/2016 | Chen |
| 9,253,181 B2 | 2/2016 | Liu et al. |
| 9,268,947 B1 | 2/2016 | Jarlstrom et al. |
| 9,275,065 B1 | 3/2016 | Ganesh et al. |
| 9,275,345 B1 | 3/2016 | Song et al. |
| 9,393,488 B2 | 7/2016 | Brownlow et al. |
| 9,514,293 B1 | 12/2016 | Moritz et al. |
| 9,516,035 B1 | 12/2016 | Moritz et al. |
| 9,614,920 B1 | 4/2017 | Kgarwal et al. |
| 9,654,485 B1 | 5/2017 | Neumann |
| 9,798,757 B2 | 10/2017 | Greene et al. |
| 9,798,883 B1 | 10/2017 | Gil et al. |
| 9,911,290 B1 | 3/2018 | Zalewski et al. |
| 10,013,728 B2 | 7/2018 | Schechter et al. |
| 10,019,561 B1 | 7/2018 | Shelton et al. |
| 10,020,076 B1 | 7/2018 | Anumalasetty et al. |
| 10,025,952 B1 | 7/2018 | Wang et al. |
| 10,044,745 B1 | 8/2018 | Jones et al. |
| 10,049,227 B1 | 8/2018 | Sampson |
| 10,052,026 B1 | 8/2018 | Tran |
| 10,057,227 B1 | 8/2018 | Hess et al. |
| 10,061,916 B1 | 8/2018 | Jiang et al. |
| 10,063,562 B1 | 8/2018 | Molina-Markham et al. |
| 10,063,579 B1 | 8/2018 | Machani |
| 10,091,180 B1 | 10/2018 | Moritz et al. |
| 10,110,942 B2 | 10/2018 | Lyons et al. |
| 10,114,935 B2 | 10/2018 | Das et al. |
| 10,165,065 B1 | 12/2018 | Anantharaju et al. |
| 10,237,298 B1 | 3/2019 | Nguyen et al. |
| 10,320,813 B1* | 6/2019 | Ahmed ............... H04L 63/1441 |
| 10,417,613 B1* | 9/2019 | Brisebois ........... G06Q 10/1095 |
| 10,424,296 B2 | 9/2019 | Penilla et al. |
| 10,440,029 B2 | 10/2019 | Hidden et al. |
| 10,614,029 B2* | 4/2020 | DiRienzo .............. G06F 16/113 |
| 2001/0040591 A1 | 11/2001 | Abbott et al. |
| 2002/0083025 A1 | 6/2002 | Robarts et al. |
| 2002/0143961 A1 | 10/2002 | Siegel et al. |
| 2002/0173295 A1 | 11/2002 | Nykanen et al. |
| 2003/0154406 A1 | 8/2003 | Honarvar et al. |
| 2003/0188191 A1 | 10/2003 | Aaron et al. |
| 2003/0204720 A1 | 10/2003 | Schoen et al. |
| 2003/0212546 A1 | 11/2003 | Shaw |
| 2003/0217024 A1 | 11/2003 | Kocher |
| 2004/0078595 A1 | 4/2004 | Kent et al. |
| 2004/0225877 A1 | 11/2004 | Huang |
| 2005/0008148 A1 | 1/2005 | Jacobson |
| 2005/0071282 A1 | 3/2005 | Lu et al. |
| 2005/0097364 A1 | 5/2005 | Edeki et al. |
| 2005/0183143 A1 | 8/2005 | Anderholm et al. |
| 2006/0034305 A1 | 2/2006 | Heimerdinger et al. |
| 2006/0136332 A1 | 6/2006 | Ziegler |
| 2006/0190822 A1 | 8/2006 | Sasson et al. |
| 2006/0195328 A1 | 8/2006 | Abraham et al. |
| 2006/0224898 A1 | 10/2006 | Ahmed |
| 2006/0259950 A1 | 11/2006 | Mattsson |
| 2007/0067853 A1 | 3/2007 | Ramsey |
| 2007/0124601 A1 | 5/2007 | Singh et al. |
| 2007/0136573 A1 | 6/2007 | Steinberg |
| 2007/0179351 A1 | 8/2007 | Kil et al. |
| 2007/0206741 A1 | 9/2007 | Tiliks et al. |
| 2008/0052288 A1 | 2/2008 | Flinn et al. |
| 2008/0104415 A1 | 5/2008 | Palti-Wasserman et al. |
| 2008/0147554 A1 | 6/2008 | Stevens et al. |
| 2008/0148376 A1 | 6/2008 | Onozawa et al. |
| 2008/0170776 A1 | 7/2008 | Albertson et al. |
| 2008/0204788 A1 | 8/2008 | Kelly et al. |
| 2008/0218472 A1 | 9/2008 | Breen et al. |
| 2008/0271143 A1 | 10/2008 | Stephens et al. |
| 2008/0313500 A1 | 12/2008 | Strauss et al. |
| 2009/0023422 A1 | 1/2009 | MacInnis et al. |
| 2009/0144619 A1 | 6/2009 | Best et al. |
| 2009/0149247 A1 | 6/2009 | Esbensen et al. |
| 2009/0158441 A1 | 6/2009 | Mohler et al. |
| 2009/0164878 A1 | 6/2009 | Cottrille |
| 2009/0177626 A1 | 7/2009 | Lottero |
| 2009/0177979 A1 | 7/2009 | Garbow |
| 2009/0199264 A1 | 8/2009 | Lang |
| 2009/0199296 A1 | 8/2009 | Xie et al. |
| 2009/0276623 A1 | 11/2009 | Jevans et al. |
| 2009/0292743 A1 | 11/2009 | Bigus et al. |
| 2009/0293121 A1 | 11/2009 | Bigus et al. |
| 2010/0014676 A1 | 1/2010 | McCarthy et al. |
| 2010/0146622 A1 | 6/2010 | Nordstrom et al. |
| 2010/0169971 A1 | 7/2010 | Raviv |
| 2010/0205667 A1 | 8/2010 | Anderson et al. |
| 2010/0257580 A1 | 10/2010 | Zhao |
| 2010/0269175 A1 | 10/2010 | Stolfo et al. |
| 2010/0332550 A1 | 12/2010 | Ainslie |
| 2011/0004520 A1 | 1/2011 | Chou et al. |
| 2011/0016534 A1* | 1/2011 | Jakobsson ............... H04L 67/22 726/28 |
| 2011/0022443 A1* | 1/2011 | Partridge ............... G01C 21/20 705/14.64 |
| 2011/0099602 A1 | 4/2011 | Apparao et al. |
| 2011/0106829 A1 | 5/2011 | Pradhan et al. |
| 2011/0173084 A1 | 7/2011 | Cheng et al. |
| 2011/0185421 A1 | 7/2011 | Wittenstein et al. |
| 2011/0212770 A1 | 9/2011 | Dcko et al. |
| 2011/0221568 A1 | 9/2011 | Giobbi |
| 2011/0231770 A1 | 9/2011 | Tovar |
| 2011/0239113 A1 | 9/2011 | Hung et al. |
| 2011/0296003 A1 | 12/2011 | McCann et al. |
| 2011/0320816 A1 | 12/2011 | Yao et al. |
| 2012/0060219 A1 | 3/2012 | Larsson et al. |

(56) References Cited

U.S. PATENT DOCUMENTS

| | | |
|---|---|---|
| 2012/0079045 A1 | 3/2012 | Plotkin |
| 2012/0084349 A1 | 4/2012 | Lee et al. |
| 2012/0101970 A1 | 4/2012 | Zernik et al. |
| 2012/0131657 A1 | 5/2012 | Sunstein et al. |
| 2012/0137367 A1* | 5/2012 | Dupont .................. G06F 21/00 726/25 |
| 2012/0144468 A1 | 6/2012 | Pratt et al. |
| 2012/0185910 A1* | 7/2012 | Miettinen .............. G06F 21/31 726/1 |
| 2012/0198569 A1 | 8/2012 | Halas |
| 2012/0258437 A1 | 10/2012 | Sadeh-Koniecpol et al. |
| 2012/0281885 A1 | 11/2012 | Syrdal et al. |
| 2012/0290518 A1 | 11/2012 | Flinn et al. |
| 2012/0297477 A1 | 11/2012 | Raviv |
| 2013/0024239 A1 | 1/2013 | Baker et al. |
| 2013/0042327 A1 | 2/2013 | Chow |
| 2013/0044055 A1 | 2/2013 | Karmarkar et al. |
| 2013/0054976 A1 | 2/2013 | Brown et al. |
| 2013/0055348 A1 | 2/2013 | Strauss et al. |
| 2013/0055367 A1 | 2/2013 | Kshirsagar et al. |
| 2013/0072169 A1 | 3/2013 | Ross et al. |
| 2013/0091085 A1 | 4/2013 | Sohn et al. |
| 2013/0097237 A1 | 4/2013 | Kothari et al. |
| 2013/0097701 A1 | 4/2013 | Moyle et al. |
| 2013/0111220 A1 | 5/2013 | Friedlander et al. |
| 2013/0111586 A1 | 5/2013 | Jackson |
| 2013/0124538 A1 | 5/2013 | Lee et al. |
| 2013/0132566 A1 | 5/2013 | Olsen et al. |
| 2013/0133054 A1* | 5/2013 | Davis .................... G06F 21/316 726/7 |
| 2013/0142363 A1 | 6/2013 | Amento et al. |
| 2013/0151515 A1 | 6/2013 | Davis et al. |
| 2013/0167192 A1 | 6/2013 | Hickman et al. |
| 2013/0167245 A1 | 6/2013 | Birtwhistle et al. |
| 2013/0238540 A1 | 9/2013 | O'Donoghue et al. |
| 2013/0252737 A1 | 9/2013 | Mescon |
| 2013/0263206 A1 | 10/2013 | Nefedov et al. |
| 2013/0291099 A1 | 10/2013 | Donfried et al. |
| 2013/0303159 A1* | 11/2013 | Gathala ................. H04W 24/00 455/425 |
| 2013/0304869 A1 | 11/2013 | Gupta et al. |
| 2013/0305357 A1 | 11/2013 | Ayyagari et al. |
| 2013/0305359 A1 | 11/2013 | Gathala et al. |
| 2014/0007186 A1 | 1/2014 | Agrawal et al. |
| 2014/0040309 A1 | 2/2014 | Meaney et al. |
| 2014/0040989 A1 | 2/2014 | Davis et al. |
| 2014/0052465 A1* | 2/2014 | Madan ................... G06F 19/00 705/2 |
| 2014/0053261 A1* | 2/2014 | Gupta ................... G06F 21/316 726/22 |
| 2014/0095419 A1 | 4/2014 | Gandhi et al. |
| 2014/0096215 A1 | 4/2014 | Hessler |
| 2014/0114899 A1 | 4/2014 | Wan et al. |
| 2014/0189784 A1 | 7/2014 | Marino et al. |
| 2014/0199663 A1 | 7/2014 | Sadeh-Koniecpol et al. |
| 2014/0207518 A1 | 7/2014 | Kannan et al. |
| 2014/0207724 A1 | 7/2014 | Ledenev et al. |
| 2014/0237595 A1 | 8/2014 | Sridhara et al. |
| 2014/0282964 A1 | 9/2014 | Stubblefield et al. |
| 2014/0283016 A1 | 9/2014 | Sambamurthy et al. |
| 2014/0289875 A1 | 9/2014 | Knafel |
| 2014/0317726 A1 | 10/2014 | Turgeman et al. |
| 2014/0317734 A1 | 10/2014 | Valencia et al. |
| 2014/0323106 A1 | 10/2014 | Nunally |
| 2014/0331279 A1 | 11/2014 | Aissi et al. |
| 2014/0333415 A1 | 11/2014 | Kursun |
| 2014/0344015 A1 | 11/2014 | Puertolas-Montanes et al. |
| 2014/0347479 A1 | 11/2014 | Givon |
| 2015/0033305 A1* | 1/2015 | Shear .................... G06F 21/53 726/6 |
| 2015/0067845 A1 | 3/2015 | Chari et al. |
| 2015/0082032 A1 | 3/2015 | Bruce et al. |
| 2015/0082441 A1 | 3/2015 | Gathala et al. |
| 2015/0106888 A1 | 4/2015 | Cheng et al. |
| 2015/0109104 A1 | 4/2015 | Fadell et al. |
| 2015/0161386 A1 | 6/2015 | Gupta et al. |
| 2015/0180894 A1 | 6/2015 | Sadovsky et al. |
| 2015/0195300 A1 | 7/2015 | Adjaoute |
| 2015/0205944 A1 | 7/2015 | Turgeman |
| 2015/0205957 A1 | 7/2015 | Turgeman et al. |
| 2015/0205958 A1 | 7/2015 | Turgeman et al. |
| 2015/0206102 A1 | 7/2015 | Cama et al. |
| 2015/0213246 A1 | 7/2015 | Turgeman et al. |
| 2015/0220734 A1 | 8/2015 | Nalluri et al. |
| 2015/0242605 A1* | 8/2015 | Du .......................... G06F 21/32 726/7 |
| 2015/0244821 A1 | 8/2015 | Burger |
| 2015/0249718 A1 | 9/2015 | Huybregts et al. |
| 2015/0254467 A1 | 9/2015 | Leuthardt et al. |
| 2015/0271207 A1 | 9/2015 | Jaiswal et al. |
| 2015/0310196 A1 | 10/2015 | Turgeman et al. |
| 2015/0324563 A1 | 11/2015 | Deutschmann et al. |
| 2015/0339477 A1 | 11/2015 | Abrams et al. |
| 2015/0339673 A1* | 11/2015 | Adjaoute ............. G06F 21/6245 705/30 |
| 2015/0358317 A1 | 12/2015 | Deutschmann et al. |
| 2015/0363770 A1 | 12/2015 | Ronca et al. |
| 2016/0029221 A1 | 1/2016 | Suarez Garcia et al. |
| 2016/0103996 A1 | 4/2016 | Salajegheh et al. |
| 2016/0110528 A1 | 4/2016 | Gupta et al. |
| 2016/0110551 A1 | 4/2016 | Fugate et al. |
| 2016/0117500 A1 | 4/2016 | Li et al. |
| 2016/0125176 A1 | 5/2016 | Scea et al. |
| 2016/0143570 A1 | 5/2016 | Valacich et al. |
| 2016/0147945 A1 | 5/2016 | MacCarthy et al. |
| 2016/0197904 A1 | 7/2016 | Taratine et al. |
| 2016/0197918 A1* | 7/2016 | Turgeman ............... G06F 21/31 726/4 |
| 2016/0203316 A1 | 7/2016 | Mace et al. |
| 2016/0210407 A1 | 7/2016 | Hwang et al. |
| 2016/0212172 A1 | 7/2016 | Senanayake et al. |
| 2016/0224800 A1 | 8/2016 | Bellert |
| 2016/0234174 A1 | 8/2016 | Zizi et al. |
| 2016/0239668 A1 | 8/2016 | Bellert |
| 2016/0241579 A1 | 8/2016 | Roosenraad et al. |
| 2016/0294959 A1 | 10/2016 | Cho |
| 2016/0306844 A1 | 10/2016 | Frank et al. |
| 2016/0306974 A1 | 10/2016 | Turgeman et al. |
| 2016/0337390 A1 | 11/2016 | Sridhara et al. |
| 2016/0352760 A1 | 12/2016 | Mrkos et al. |
| 2016/0352778 A1 | 12/2016 | Chari et al. |
| 2017/0010665 A1 | 1/2017 | Tanaka et al. |
| 2017/0032248 A1 | 2/2017 | Dotan-Cohen et al. |
| 2017/0033932 A1 | 2/2017 | Truu et al. |
| 2017/0041148 A1 | 2/2017 | Pearce |
| 2017/0063886 A1 | 3/2017 | Muddu et al. |
| 2017/0085534 A1 | 3/2017 | Iyer et al. |
| 2017/0085587 A1 | 3/2017 | Turgeman |
| 2017/0111432 A1 | 4/2017 | Saini et al. |
| 2017/0134412 A1 | 5/2017 | Cheng et al. |
| 2017/0140279 A1 | 5/2017 | Turgeman |
| 2017/0161478 A1 | 6/2017 | Stavrou et al. |
| 2017/0161503 A1 | 6/2017 | Seigel et al. |
| 2017/0161525 A1 | 6/2017 | Vieira et al. |
| 2017/0177884 A1 | 6/2017 | Mehta et al. |
| 2017/0201531 A1 | 7/2017 | Kim et al. |
| 2017/0230417 A1 | 8/2017 | Amar et al. |
| 2017/0230418 A1 | 8/2017 | Amar et al. |
| 2017/0243223 A1 | 8/2017 | Kolotinsky et al. |
| 2017/0244718 A1* | 8/2017 | Andreeva ............... H04L 63/08 |
| 2017/0251007 A1 | 8/2017 | Fujisawa et al. |
| 2017/0251008 A1* | 8/2017 | Andreeva ............ G06F 21/316 |
| 2017/0257358 A1 | 9/2017 | Ebrahimi et al. |
| 2017/0272472 A1 | 9/2017 | Adhar |
| 2017/0279801 A1 | 9/2017 | Andrade |
| 2017/0286671 A1 | 10/2017 | Chari et al. |
| 2017/0366348 A1 | 12/2017 | Weimer et al. |
| 2018/0013780 A1 | 1/2018 | Mao et al. |
| 2018/0039990 A1 | 2/2018 | Lindemann |
| 2018/0041503 A1 | 2/2018 | Lindemann |
| 2018/0077099 A1 | 3/2018 | Silva et al. |
| 2018/0077166 A1* | 3/2018 | Kovega ................ H04L 67/306 |
| 2018/0144110 A1 | 5/2018 | Creamer et al. |

(56) References Cited

U.S. PATENT DOCUMENTS

| | | | |
|---|---|---|---|
| 2018/0152403 A1* | 5/2018 | Charignon | H04L 63/104 |
| 2018/0158165 A1 | 6/2018 | Hodge | |
| 2018/0174493 A1 | 6/2018 | Ohori et al. | |
| 2018/0188916 A1 | 7/2018 | Lyons et al. | |
| 2018/0219914 A1 | 8/2018 | Reith et al. | |
| 2018/0241761 A1 | 8/2018 | Bania et al. | |
| 2018/0255080 A1 | 9/2018 | Paine | |
| 2018/0263545 A1 | 9/2018 | Camporesi et al. | |
| 2018/0276006 A1 | 9/2018 | Sambasivam et al. | |
| 2018/0288161 A1* | 10/2018 | Saxena | H04L 67/125 |
| 2018/0310171 A1 | 10/2018 | Whitaker et al. | |

OTHER PUBLICATIONS microsoft.com, Windows Search Overview, htttps://msdn.microsoft.com/en-us/library/windows/desktop/aa965362, printed Nov. 20, 2017.
Stephen G. Dimmock et al., Is Fraud Contagious? Co-Worker Influence on Misconduct by Financial Advisers, The Journal of Finance, first published online Feb. 3, 2018.
guardtime.com, KSI Blockchain Technology, printed Jul. 13, 2017.
Guy Zyskind et al., Decentralizing Privacy: Using Blockchain to Protect Personal Data, 2015 IEEE CS Security and Privacy Workshops, pp. 180-184, http://inpluslab.sysu.edu.cn/files/Paper/Security/Decentralizing_Privacy_Using_Blockchain_To_Protect_Personal_Data.pdf.
Malek Ben Salem et al., A Survey of Insider Attack Detection Research, Insider Attack and Cyber Security: Beyond the Hacker, Springer, 2008 https://pdfs.semanticscholar.org/3135/eb4b37aa487dd5f06dfa178bbc1d874f3cdf.pdf.
Amos Azaria et al., Behavioral Analysis of Insider Threat: A Survey and Bootstrapped Prediction in Imbalanced Data, Journal of Latex Class Files, vol. 6, No. 1, Jan. 2007.
Mike Hintze et al., Comparing the Benefits of Pseudonymization and Anonymization Under the GDPR, Privacy Analytics, White Paper, 2017.
google.com, Phishing Prevention with Password Alert FAQ, printed Feb. 22, 2018.

\* cited by examiner

| Adaptive Trust Profile 640 | | | |
|---|---|---|---|
| Entity State 638 | Entity Attributes 1004 | Behavioral Models 1006 | Inferences 1008 |
| • Short-term<br>　- The world as it is now<br>• Long-term<br>　- Persistent or recurring | • Long-lived<br>　- Machine name, GUID, MAC address | • Slowly evolving<br>　- Provide Insight into how unexpected a set of events is | • Slowly-evolving<br>　- "This account is compromised"<br>　- "Eve will leave the company" |

FIGURE 10

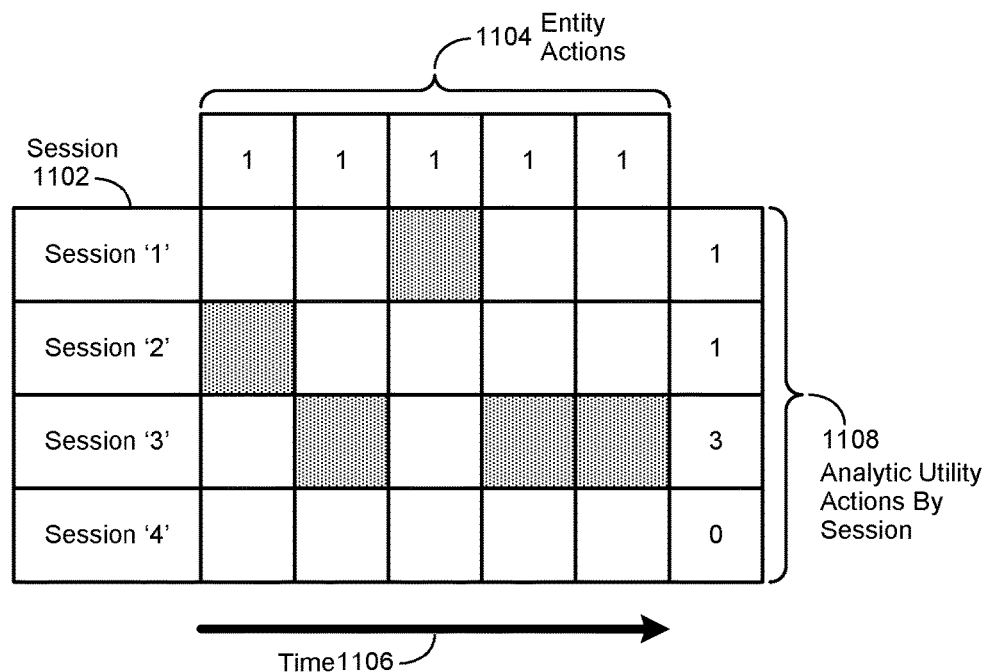

FIGURE 11

ADAPTIVE TRUST PROFILE COMPONENTS

BACKGROUND OF THE INVENTION

Field of the Invention

The present invention relates in general to the field of computers and similar technologies, and in particular to software utilized in this field. Still more particularly, it relates to a method, system and computer-usable medium for using entity profile attributes to adaptively mitigate risk.

Description of the Related Art

Users interact with physical, system, data, and services resources of all kinds, as well as each other, on a daily basis. Each of these interactions, whether accidental or intended, poses some degree of security risk, depending on the behavior of the user. In particular, the actions of a formerly trusted user may become malicious as a result of being subverted, compromised or radicalized due to any number of internal or external factors or stressors. For example, financial pressure, political idealism, irrational thoughts, or other influences may adversely affect a user's intent and/or behavior.

SUMMARY OF THE INVENTION

In one embodiment the invention relates to a method for generating an adaptive trust profile, comprising: monitoring a plurality of electronically-observable actions of an entity, the plurality of electronically-observable actions of the entity corresponding to a plurality of respective events enacted by the entity; converting the plurality of electronically-observable actions of the entity to electronic information representing the plurality of actions of the entity; and generating the adaptive trust profile based upon the plurality of actions of the entity, the adaptive trust profile comprising a plurality of adaptive trust profile components.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: monitoring a plurality of electronically-observable actions of an entity, the plurality of electronically-observable actions of the entity corresponding to a plurality of respective events enacted by the entity; converting the plurality of electronically-observable actions of the entity to electronic information representing the plurality of actions of the entity; and generating the adaptive trust profile based upon the plurality of actions of the entity, the adaptive trust profile comprising a plurality of adaptive trust profile components.

In another embodiment the invention relates to a computer-readable storage medium embodying computer program code, the computer program code comprising computer executable instructions configured for: monitoring a plurality of electronically-observable actions of an entity, the plurality of electronically-observable actions of the entity corresponding to a plurality of respective events enacted by the entity; converting the plurality of electronically-observable actions of the entity to electronic information representing the plurality of actions of the entity; and generating the adaptive trust profile based upon the plurality of actions of the entity, the adaptive trust profile comprising a plurality of adaptive trust profile components.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 10 is a table showing components of an ATP;

FIG. 11 is a table showing analytic utility actions occurring during a session;

DETAILED DESCRIPTION

Figure 1:
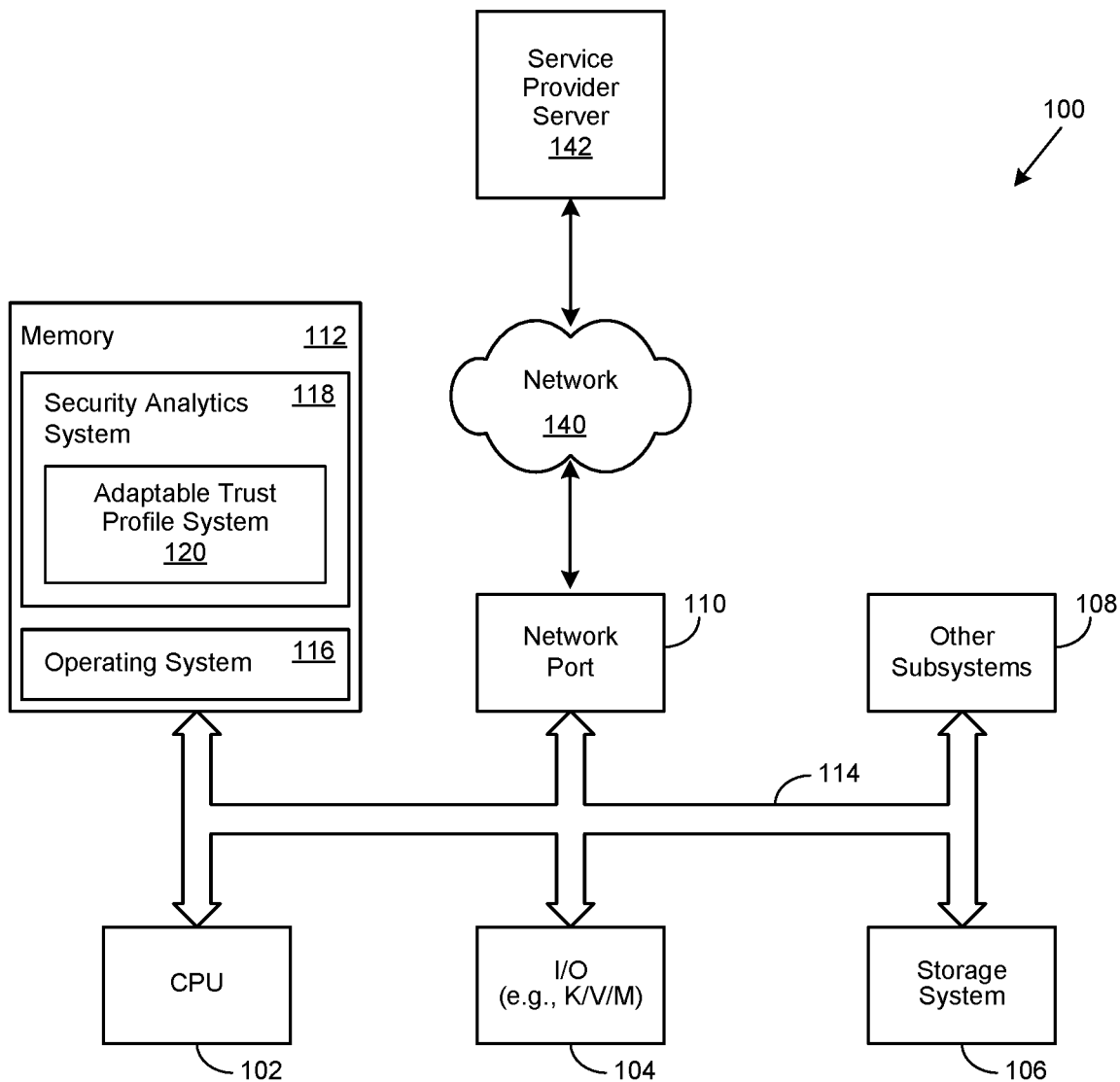
FIG. 1 depicts an exemplary client computer in which the present invention may be implemented.

A method, system and computer-usable medium are disclosed for using entity profile attributes to adaptively mitigate risk. Certain aspects of the invention include an appreciation that the existence of any entity, whether it is an individual user, a group of users, an organization, a device, a system, a network, an account, a domain, an operation, a process, a software application, or a service, represents some degree of security risk. Various aspects of the invention likewise include an appreciation that certain non-user entities, such as computing, communication, and surveillance devices can be a source for telemetry associated with certain events and entity behaviors. Likewise, various aspects of the invention include an appreciation that certain accounts may be global, spanning multiple devices, such as a domain-level account allowing an entity access to multiple systems. Certain aspects of the invention likewise include an appreciation that a particular account may be shared by multiple entities.

Accordingly, certain aspects of the invention include an appreciation that a particular entity can be assigned a measure of risk according to its respective attributes, associated behavioral models, and resultant inferences contained in an associated profile. As an example, a first profile may have an attribute that its corresponding entity works in the human resource department, while a second profile may have an attribute that its corresponding entity is an email server. To continue the example, the first profile may have an associated behavioral model that indicates its corresponding entity is not acting as they did the day before, while the second profile may have an associated behavioral model that indicates its corresponding entity is connecting to a suspicious IP address. To further continue the example, the first profile may have a resultant inference that its corresponding entity is likely to be leaving the company, while the second profile may have a resultant inference that there is a high probability its corresponding entity is compromised. Certain embodiments of the invention likewise include an appreciation that the measure of risk assigned to a particular entity can be adaptively revised according to corresponding changes in its respective attributes, associated behavioral models, and resultant inferences contained in an associated profile.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118. In one embodiment, the information handling system 100 is able to download the security analytics system 118 from the service provider server 142. In another embodiment, the security analytics system 118 is provided as a service from the service provider server 142.

In various embodiments, the security analytics system 118 performs a security analytics operation. In certain embodiments, the security analytics operation improves processor efficiency, and thus the efficiency of the information handling system 100, by facilitating security analytics functions. As will be appreciated, once the information handling system 100 is configured to perform the security analytics operation, the information handling system 100 becomes a specialized computing device specifically configured to perform the security analytics operation and is not a general purpose computing device. Moreover, the implementation of the security analytics system 118 on the information handling system 100 improves the functionality of the information handling system 100 and provides a useful and concrete result of performing security analytics functions to mitigate security risk. In certain embodiments, the security analytics system 118 may be implemented to include an adaptable trust profile (ATP) system 120. In certain embodiments, the ATP system 120 may be implemented to perform various ATP operations, described in greater detail herein.

Figure 2:
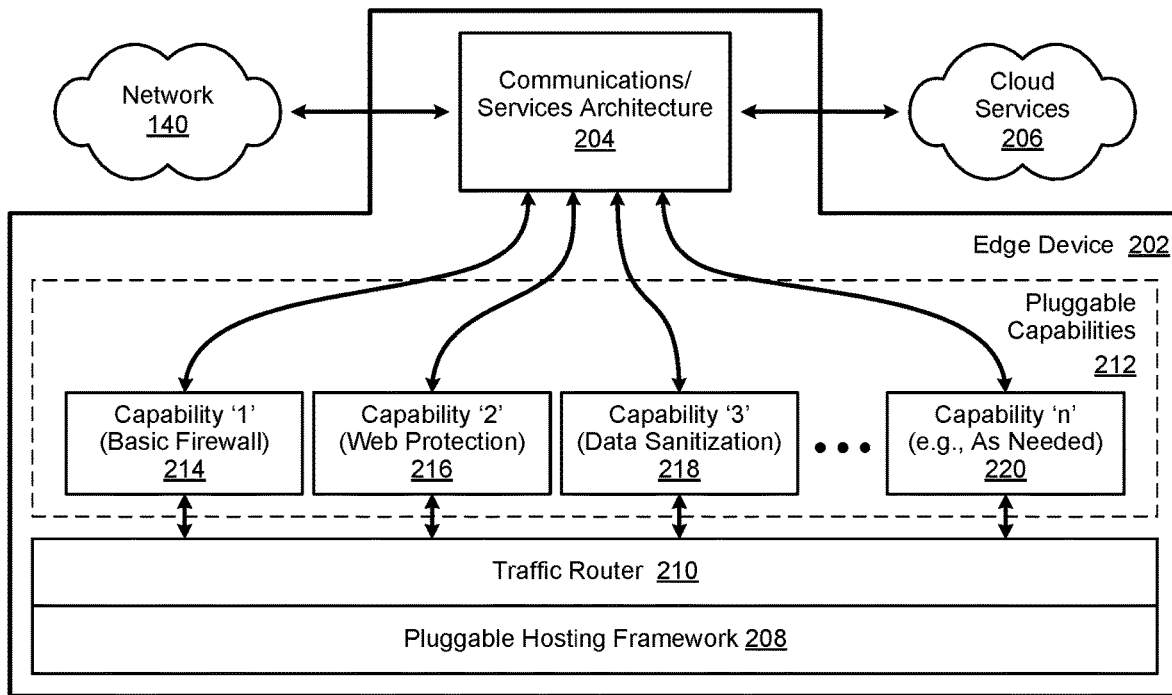
FIG. 2 is a simplified block diagram of an edge device.

FIG. 2 is a simplified block diagram of an edge device implemented in accordance with an embodiment of the invention. As used herein, an edge device, such as the edge device 202 shown in FIG. 2, broadly refers to a device providing an entry point into a network 140. Examples of such edge devices 202 may include routers, routing switches, integrated access devices (IADs), multiplexers, wide-area network (WAN) access devices, and network security appliances. In certain embodiments, the network 140 may be a private network (e.g., an enterprise network), a semi-public network (e.g., a service provider core network), or a public network (e.g., the Internet).

Skilled practitioners of the art will be aware that edge devices 202 are often implemented as routers that provide authenticated access to faster, more efficient backbone and core networks. Furthermore, current industry trends include making edge devices 202 more intelligent, which allows core devices to operate at higher speed as they are not burdened with additional administrative overhead. Accordingly, such edge devices 202 often include Quality of Service (QoS) and multi-service functions to manage different types of traffic. Consequently, it is common to design core networks with switches that use routing protocols such as Open Shortest Path First (OSPF) or Multiprotocol Label Switching (MPLS) for reliability and scalability. Such approaches allow edge devices 202 to have redundant links to the core network, which not only provides improved reliability, but enables enhanced, flexible, and scalable security capabilities as well.

In certain embodiments, the edge device 202 may be implemented to include a communications/services architecture 204, various pluggable capabilities 212, a traffic router 210, and a pluggable hosting framework 208. In certain embodiments, the communications/services architecture 202 may be implemented to provide access to and from various networks 140, cloud services 206, or a combination thereof. In certain embodiments, the cloud services 206 may be provided by a cloud infrastructure familiar to those of skill in the art. In certain embodiments, the edge device 202 may be implemented to provide support for a variety of generic services, such as directory integration, logging interfaces, update services, and bidirectional risk/context flows associated with various analytics. In certain embodiments, the edge device 202 may be implemented to provide temporal information, described in greater detail herein, associated with the provision of such services.

In certain embodiments, the edge device 202 may be implemented as a generic device configured to host various network communications, data processing, and security management capabilities. In certain embodiments, the pluggable hosting framework 208 may be implemented to host such capabilities in the form of pluggable capabilities 212. In certain embodiments, the pluggable capabilities 212 may include capability '1' 214 (e.g., basic firewall), capability '2' 216 (e.g., general web protection), capability '3' 218 (e.g., data sanitization), and so forth through capability 'n' 220, which may include capabilities needed for a particular operation, process, or requirement on an as-needed basis. In certain embodiments, such capabilities may include the performance of operations associated with managing an adaptive trust Profile (ATP), described in greater detail herein. In certain embodiments, such operations may include the provision of associated temporal information (e.g., time stamps).

In certain embodiments, the pluggable capabilities 212 may be sourced from various cloud services 206. In certain embodiments, the pluggable hosting framework 208 may be implemented to provide certain computing and communication infrastructure components, and foundation capabilities, required by one or more of the pluggable capabilities 212. In certain embodiments, the pluggable hosting framework 208 may be implemented to allow the pluggable capabilities 212 to be dynamically invoked. Skilled practitioners of the art will recognize that many such embodiments are possible. Accordingly, the foregoing is not intended to limit the spirit, scope or intent of the invention.

Figure 3:
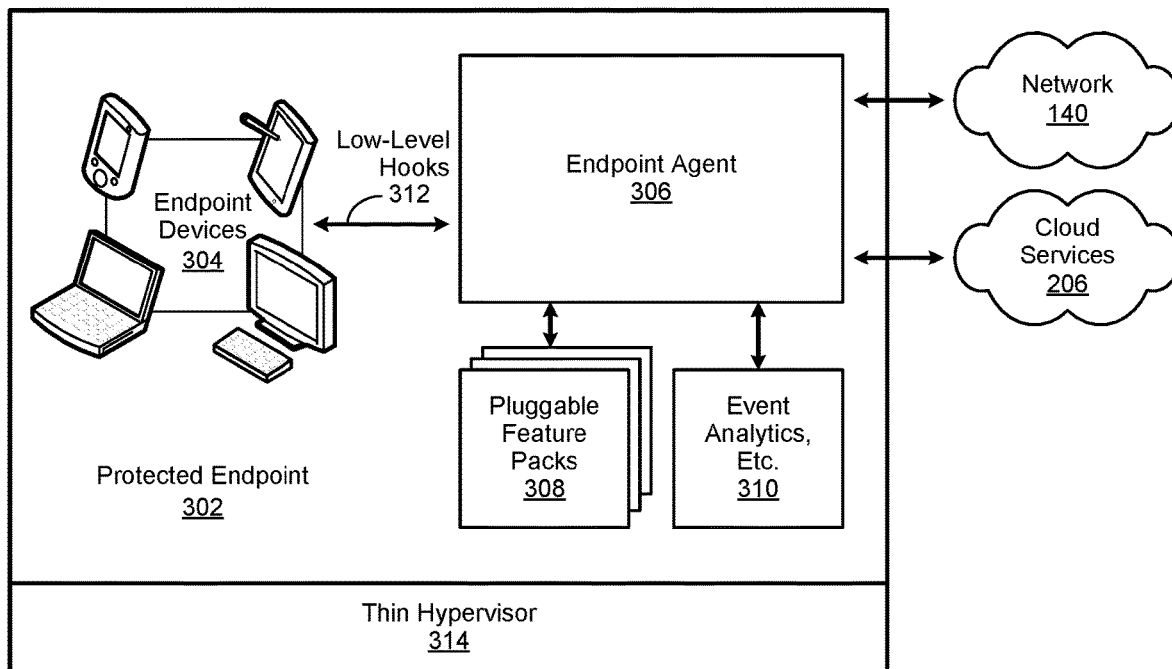
FIG. 3 is a simplified block diagram of an endpoint agent.

FIG. 3 is a simplified block diagram of an endpoint agent implemented in accordance with an embodiment of the invention. As used herein, an endpoint agent 306 broadly refers to a software agent used in combination with an endpoint device 304 to establish a protected endpoint 302. Skilled practitioners of the art will be familiar with software agents, which are computer programs that perform actions on behalf of a user or another program. In various approaches, a software agent may be autonomous or work together with another agent or a user. In certain of these approaches the software agent is implemented to autonomously decide if a particular action is appropriate for a given event, such as an observed entity behavior.

An endpoint device 304, as likewise used herein, refers to an information processing system such as a personal computer, a laptop computer, a tablet computer, a personal digital assistant (PDA), a smart phone, a mobile telephone, a digital camera, a video camera, or other device capable of storing, processing and communicating data. In certain embodiments, the communication of the data may take place in real-time or near-real-time. As used herein, real-time broadly refers to processing and providing information within a time interval brief enough to not be discernable by a user. As an example, a cellular phone conversation may be used to communicate information in real-time, while an instant message (IM) exchange may be used to communicate information in near real-time. In certain embodiments, the communication of the information may take place asynchronously. For example, an email message may be stored on an endpoint device 304 when it is offline. In this example, the information may be communicated to its intended recipient once the endpoint device 304 gains access to a network 140.

A protected endpoint 302, as likewise used herein, broadly refers to a policy-based approach to network security that typically requires endpoint devices 304 to comply with certain criteria before they are granted access to network resources. As an example, a given endpoint device 304 may be required to have a particular operating system (OS), or version thereof, a Virtual Private Network (VPN) client, anti-virus software with current updates, and so forth. In certain embodiments, the protected endpoint 302 may be implemented to perform operations associated with providing real-time resolution of the identity of an entity at a particular point in time, as described in greater detail herein. In certain embodiments, the protected endpoint 302 may be implemented to provide temporal information, such as timestamp information, associated with such operations.

In certain embodiments, the real-time resolution of the identity of an entity at a particular point in time may be based upon contextual information associated with a given entity behavior. As used herein, contextual information broadly refers to any information, directly or indirectly, individually or in combination, related to a particular entity behavior. In certain embodiments, entity behavior may include an entity's physical behavior, cyber behavior, or a combination thereof. As likewise used herein, physical behavior broadly refers to any entity behavior occurring within a physical realm. More particularly, physical behavior may include any action enacted by an entity that can be objectively observed, or indirectly inferred, within a physical realm.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable entity behavior broadly refers to any behavior exhibited or enacted by a entity that can be electronically observed.

Cyber behavior, as used herein, broadly refers to any behavior occurring in cyberspace, whether enacted by an individual user, a group of users, or a system acting at the behest of an individual user, a group of users, or an entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

As likewise used herein, cyberspace broadly refers to a network 140 environment capable of supporting communication between two or more entities. In certain embodiments, the entity may be a user, an endpoint device 304, or various resources, described in greater detail herein. In certain embodiments, the entities may include various endpoint devices 304 or resources operating at the behest of an entity, such as a user. In certain embodiments, the communication between the entities may include audio, image, video, text, or binary data.

As described in greater detail herein, the contextual information may include a user's authentication factors. Contextual information may likewise include various temporal identity resolution factors, such as identification factors associated with the entity, the date/time/frequency of various entity behaviors, the entity's location, the entity's role or position in an organization, their associated access rights, and certain user gestures employed by a user in the enactment of a user behavior. Other contextual information may likewise include various user interactions, whether the interactions are with an endpoint device 304, a network 140, a resource, or another user. In certain embodiments, entity behaviors, and their related contextual information, may be collected at particular points of observation, and at particular points in time, described in greater detail herein. In certain embodiments, a protected endpoint 302 may be implemented as a point of observation for the collection of entity behavior and contextual information.

In certain embodiments, the endpoint agent 306 may be implemented to universally support a variety of operating systems, such as Apple Macintosh®, Microsoft Windows®, Linux®, Android® and so forth. In certain embodiments, the endpoint agent 306 may be implemented to interact with the endpoint device 304 through the use of low-level hooks 312 at the operating system level. It will be appreciated that the use of low-level hooks 312 allows the endpoint agent 306 to subscribe to multiple events through a single hook. Consequently, multiple functionalities provided by the endpoint agent 306 can share a single data stream, using only those portions of the data stream they may individually need. Accordingly, system efficiency can be improved and operational overhead reduced.

In certain embodiments, the endpoint agent 306 may be implemented to provide a common infrastructure for pluggable feature packs 308. In various embodiments, the pluggable feature packs 308 may provide certain security management functionalities. Examples of such functionalities may include various anti-virus and malware detection, data loss protection (DLP), insider threat detection, and so forth. In certain embodiments, the security management functionalities may include one or more functionalities associated with providing real-time resolution of the identity of an entity at a particular point in time, as described in greater detail herein.

In certain embodiments, a particular pluggable feature pack 308 is invoked as needed by the endpoint agent 306 to provide a given functionality. In certain embodiments, individual features of a particular pluggable feature pack 308 are invoked as needed. It will be appreciated that the ability to invoke individual features of a pluggable feature pack 308, without necessarily invoking all such features, will likely improve the operational efficiency of the endpoint agent 306 while simultaneously reducing operational overhead. Accordingly, the endpoint agent 306 can self-optimize in certain embodiments by using the common infrastructure and invoking only those pluggable components that are applicable or needed for a given user behavior.

In certain embodiments, the individual features of a pluggable feature pack 308 are invoked by the endpoint agent 306 according to the occurrence of a particular user behavior. In certain embodiments, the individual features of a pluggable feature pack 308 are invoked by the endpoint agent 306 according to the occurrence of a particular temporal event, described in greater detail herein. In certain embodiments, the individual features of a pluggable feature pack 308 are invoked by the endpoint agent 306 at a particular point in time. In these embodiments, the method by which a given user behavior, temporal event, or point in time is selected is a matter of design choice.

In certain embodiments, the individual features of a pluggable feature pack 308 may be invoked by the endpoint agent 306 according to the context of a particular user behavior. As an example, the context may be the user enacting the user behavior, their associated risk classification, which resource they may be requesting, the point in time the user behavior is enacted, and so forth. In certain embodiments, the pluggable feature packs 308 may be sourced from various cloud services 206. In certain embodiments, the pluggable feature packs 308 may be dynamically sourced from various cloud services 206 by the endpoint agent 306 on an as-need basis.

In certain embodiments, the endpoint agent 306 may be implemented with additional functionalities, such as event analytics 310. In certain embodiments, the event analytics 310 functionality may include analysis of various user behaviors, described in greater detail herein. In certain embodiments, the endpoint agent 306 may be implemented with a thin hypervisor 314, which can be run at Ring −1, thereby providing protection for the endpoint agent 306 in the event of a breach. As used herein, a thin hypervisor broadly refers to a simplified, OS-dependent hypervisor implemented to increase security. As likewise used herein, Ring −1 broadly refers to approaches allowing guest operating systems to run Ring 0 (i.e., kernel) operations without affecting other guests or the host OS. Those of skill in the art will recognize that many such embodiments and examples are possible. Accordingly, the foregoing is not intended to limit the spirit, scope or intent of the invention.

Figure 4:
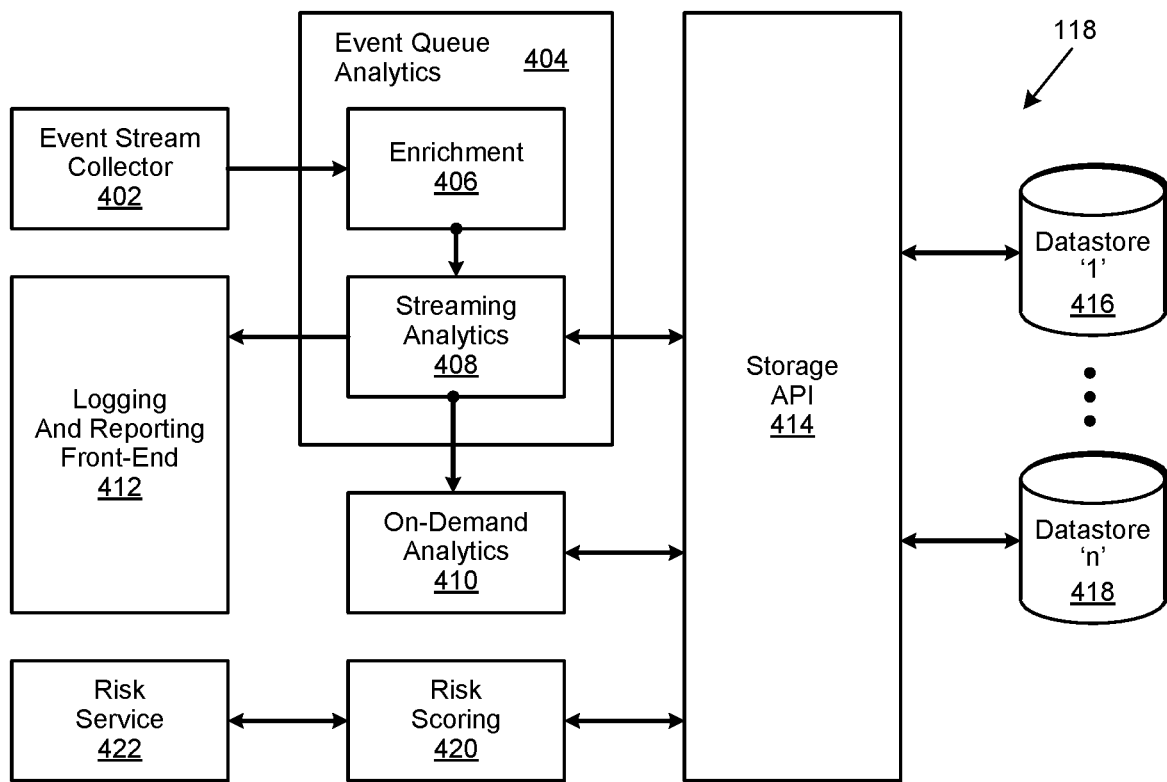
FIG. 4 is a simplified block diagram of a security analytics system.

FIG. 4 is a simplified block diagram of a security analytics system implemented in accordance with an embodiment of the invention. In certain embodiments, the security analytics system 118 shown in FIG. 4 may include an event queue analytics 404 module, described in greater detail herein. In certain embodiments, the event queue analytics 404 subsystem may be implemented to include an enrichment 406 module and a streaming analytics 408 module. In certain embodiments, the security analytics system 118 may be implemented to provide log storage, reporting, and analytics capable of performing streaming 408 and on-demand 410 analytics operations. In certain embodiments, such operations may be associated with defining and managing an adaptive trust profile (ATP), detecting entity behavior that may be of analytic utility, adaptively responding to mitigate risk, or a combination thereof, as described in greater detail herein. In certain embodiments, entity behavior of analytic utility may be determined to be anomalous, abnormal, unexpected, malicious, or some combination thereof, as described in greater detail herein.

In certain embodiments, the security analytics system 118 may be implemented to provide a uniform platform for storing events and contextual information associated with various entity behaviors and performing longitudinal analytics. As used herein, longitudinal analytics broadly refers to performing analytics of entity behaviors occurring over a particular period of time. As an example, an entity may iteratively attempt to access certain proprietary information stored in various locations. In addition, the attempts may occur over a brief period of time. To continue the example, the fact that the information the entity is attempting to access is proprietary, that it is stored in various locations, and the attempts are occurring in a brief period of time, in combination, may indicate the entity behavior enacted by the entity is suspicious. As another example, certain entity identifier information (e.g., a user name) associated with an entity may change over time. In this example, a change in the entity's user name, during a particular period of time or at a particular point in time, may represent suspicious entity behavior.

In certain embodiments, the security analytics system 118 may be implemented to be scalable. In certain embodiments, the security analytics system 118 may be implemented in a centralized location, such as a corporate data center. In these embodiments, additional resources may be added to the security analytics system 118 as needs grow. In certain embodiments, the security analytics system 118 may be implemented as a distributed system. In these embodiments, the security analytics system 118 may span multiple information handling systems. In certain embodiments, the security analytics system 118 may be implemented in a cloud environment. In certain embodiments, the security analytics system 118 may be implemented in a virtual machine (VM) environment. In such embodiments, the VM environment may be configured to dynamically and seamlessly scale the security analytics system 118 as needed. Skilled practitioners of the art will recognize that many such embodiments are possible. Accordingly, the foregoing is not intended to limit the spirit, scope or intent of the invention.

In certain embodiments, an event stream collector 402 may be implemented to collect event and related contextual information, described in greater detail herein, associated with various entity behaviors. In these embodiments, the method by which the event and contextual information is selected to be collected by the event stream collector 402 is a matter of design choice. In certain embodiments, the event and contextual information collected by the event stream collector 402 may be processed by an enrichment module 406 to generate enriched entity behavior information. In certain embodiments, the enrichment may include certain contextual information related to a particular entity behavior or event. In certain embodiments, the enrichment may include certain temporal information, such as timestamp information, related to a particular entity behavior or event.

In certain embodiments, enriched entity behavior information may be provided by the enrichment module 406 to a streaming 408 analytics module. In turn, the streaming 408 analytics module may provide some or all of the enriched entity behavior information to an on-demand 410 analytics module. As used herein, streaming 408 analytics broadly refers to analytics performed in near real-time on enriched entity behavior information as it is received. Likewise, on-demand 410 analytics broadly refers herein to analytics performed, as they are requested, on enriched entity behavior information after it has been received. In certain embodiments, the enriched entity behavior information may be associated with a particular event. In certain embodiments, the enrichment 406 and streaming analytics 408 modules may be implemented to perform event queue analytics 404 operations, as described in greater detail herein.

In certain embodiments, the on-demand 410 analytics may be performed on enriched entity behavior associated with a particular interval of, or point in, time. In certain embodiments, the streaming 408 or on-demand 410 analytics may be performed on enriched entity behavior associated with a particular user, group of users, one or more non-user entities, or a combination thereof. In certain embodiments, the streaming 408 or on-demand 410 analytics may be performed on enriched entity behavior associated with a particular resource, such as a facility, system, datastore, or service. Those of skill in the art will recognize that many such embodiments are possible. Accordingly, the foregoing is not intended to limit the spirit, scope or intent of the invention.

In certain embodiments, the results of various analytics operations performed by the streaming 408 or on-demand 410 analytics modules may be provided to a storage Application Program Interface (API) 414. In turn, the storage API 412 may be implemented to provide access to various datastores '1' 416 through 'n' 418, which in turn are used to store the results of the analytics operations. In certain embodiments, the security analytics system 118 may be implemented with a logging and reporting front-end 412, which is used to receive the results of analytics operations performed by the streaming 408 analytics module. In certain embodiments, the datastores '1' 416 through 'n' 418 may variously include a datastore of entity identifiers, temporal events, or a combination thereof.

In certain embodiments, the security analytics system 118 may include a risk scoring 420 module implemented to perform risk scoring operations, described in greater detail herein. In certain embodiments, functionalities of the risk scoring 420 module may be provided in the form of a risk management service 422. In certain embodiments, the risk management service 422 may be implemented to perform operations associated with defining and managing an adaptive trust profile (ATP), as described in greater detail herein. In certain embodiments, the risk management service 422 may be implemented to perform operations associated with detecting entity behavior that may be of analytic utility and adaptively responding to mitigate risk, as described in greater detail herein. In certain embodiments, the risk management service 422 may be implemented to provide the results of various analytics operations performed by the streaming 406 or on-demand 408 analytics modules. In certain embodiments, the risk management service 422 may be implemented to use the storage API 412 to access various enhanced cyber behavior and analytics information stored on the datastores '1' 414 through 'n' 416. Skilled practitioners of the art will recognize that many such embodiments are possible. Accordingly, the foregoing is not intended to limit the spirit, scope or intent of the invention.

Figure 5:
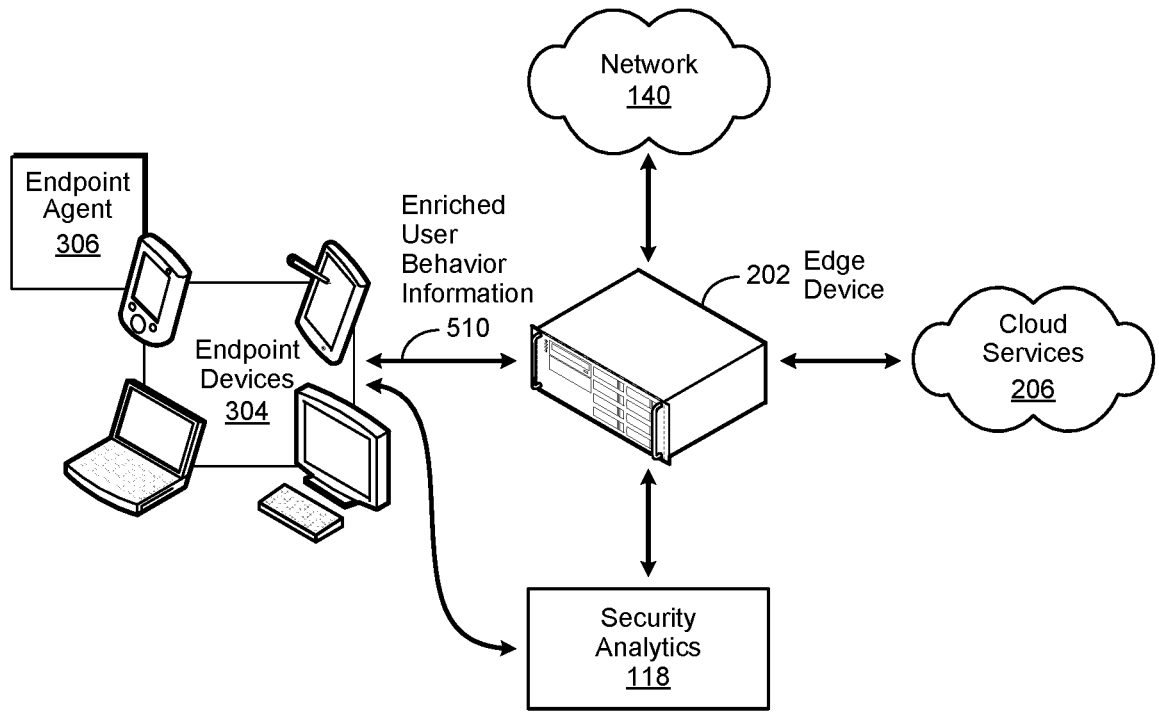
FIG. 5 is a simplified block diagram of a security analytics system.

FIG. 5 is a simplified block diagram of the operation of a security analytics system implemented in accordance with an embodiment of the invention. In certain embodiments, the security analytics system 118 may be implemented to perform operations associated with detecting entity behavior that may be of analytic utility, as described in greater detail herein. In certain embodiments, the security analytics system 118 may be implemented in combination with one or more endpoint agents 306, one or more edge devices 202, various cloud services 206, and a network 140 to perform such operations.

In certain embodiments, the network edge device 202 may be implemented in a bridge, a firewall, or a passive monitoring configuration. In certain embodiments, the edge device 202 may be implemented as software running on an information handling system. In certain embodiments, the network edge device 202 may be implemented to provide integrated logging, updating and control. In certain embodiments, the edge device 202 may be implemented to receive network requests and context-sensitive user behavior information in the form of enriched user behavior information 510, described in greater detail herein, from an endpoint agent 306, likewise described in greater detail herein.

In certain embodiments, the security analytics system 118 may be implemented as both a source and a sink of user behavior information. In certain embodiments, the security analytics system 118 may be implemented to serve requests for user/resource risk data. In certain embodiments, the edge device 202 and the endpoint agent 306, individually or in combination, may provide certain entity behavior information to the security analytics system 118 using either push or pull approaches familiar to skilled practitioners of the art.

As described in greater detail herein, the edge device 202 may be implemented in certain embodiments to receive enriched user behavior information 510 from the endpoint agent 306. It will be appreciated that such enriched user behavior information 510 will likely not be available for provision to the edge device 202 when an endpoint agent 306 is not implemented for a corresponding endpoint device 304. However, the lack of such enriched user behavior information 510 may be accommodated in various embodiments, albeit with reduced functionality related to operations associated with defining and managing an entity profile, detecting entity behavior that may be normal or of analytic utility, mitigating associated risk, or a combination thereof.

In certain embodiments, a given user behavior may be enriched by an associated endpoint agent 306 attaching contextual information to a request. In certain embodiments, the context is embedded within a network request, which is then provided as enriched user behavior information 510. In certain embodiments, the contextual information may be concatenated, or appended, to a request, which in turn may be provided as enriched user behavior information 510. In these embodiments, the enriched user behavior information 510 may be unpacked upon receipt and parsed to separate the request and its associated contextual information. Certain embodiments of the invention reflect an appreciation that one possible disadvantage of such an approach is that it may perturb certain Intrusion Detection System and/or Intrusion Detection Prevention (IDS/IDP) systems implemented on a network 140.

In certain embodiments, new flow requests may be accompanied by a contextual information packet sent to the edge device 202. In these embodiments, the new flow requests may be provided as enriched user behavior information 510. In certain embodiments, the endpoint agent 306 may also send updated contextual information to the edge device 202 once it becomes available. As an example, an endpoint agent 306 may share a list of files that have been read by a current process at any point in time once the information has been collected. To continue the example, such a list of files may be used to determine which data the endpoint agent 306 may be attempting to exfiltrate.

In certain embodiments, point analytics processes executing on the edge device 202 may request a particular service. As an example, risk scores associated with a particular event on a per-user basis may be requested. In certain embodiments, the service may be requested from the security analytics system 118. In certain embodiments, the service may be requested from various cloud services 206.

In certain embodiments, contextual information associated with a particular entity behavior may be attached to various network service requests. In certain embodiments, the request may be wrapped and then handled by proxy. In certain embodiments, a small packet of contextual information associated with an entity behavior may be sent with a service request. In certain embodiments, service requests may be related to Domain Name Service (DNS), web browsing activity, email, and so forth, all of which are essentially requests for service by an endpoint device 304. In certain embodiments, such service requests may be associated with temporal event information, described in greater detail herein. Consequently, such requests can be enriched by the addition of entity behavior contextual information (e.g., UserAccount, interactive/automated, data-touched, temporal event information, etc.). Accordingly, the edge device 202 can then use this information to manage the appropriate response to submitted requests.

In certain embodiments, the security analytics system 118 may be implemented in different operational configurations. In certain embodiments, the security analytics system 118 may be implemented by using the endpoint agent 306. In certain embodiments, the security analytics system 118 may be implemented by using endpoint agent 306 in combination with the edge device 202. In certain embodiments, the cloud services 206 may likewise be implemented for use by the endpoint agent 306, the edge device 202, and the security analytics system 118, individually or in combination. In these embodiments, the security analytics system 118 may be primarily oriented to performing risk assessment operations related to entity actions, software program actions, data accesses, or a combination thereof. In certain embodiments, software program actions may be treated as a proxy for the entity.

In certain embodiments, the endpoint agent 306 may be implemented to update the security analytics system 118 with user behavior and associated contextual information, thereby allowing an offload of certain analytics processing overhead. In certain embodiments, this approach allows for longitudinal risk scoring, which assesses risk associated with certain user behavior during a particular interval of time. In certain embodiments, the security analytics system 118 may be implemented to access risk scores associated with the same user account, but accrued on different endpoint devices 304. It will be appreciated that such an approach may prove advantageous when an adversary is "moving sideways" through a network environment, using different endpoint devices 304 to collect information.

In certain embodiments, the security analytics system 118 may be primarily oriented to applying risk mitigations in a way that maximizes security effort return-on-investment (ROI). In certain embodiments, this approach may be accomplished by providing additional contextual and entity behavior information associated with entity requests. As an example, a web gateway may not concern itself with why a particular file is being requested by a certain entity at a particular point in time. Accordingly, if the file cannot be identified as malicious or harmless, there is no context available to determine how, or if, to proceed. To extend the example, the edge device 202 and security analytics system 118 may be coupled such that requests can be contextualized and fitted into a framework that evaluates their associated risk. Certain embodiments of the invention reflect an appreciation that such an approach works well with web-based data loss protection (DLP) approaches, as each transfer is no longer examined in isolation, but in the broader context of an identified entity's actions, at a particular time, on the network 140.

As another example, the security analytics system 118 may be implemented to perform risk scoring processes to decide whether to block or allow unusual flows. In various embodiments, the risk scoring processes may be implemented to include certain aspects of eXtensible Access Control Markup Language (XACML) approaches known to skilled practitioners of the art. In certain embodiments, XACML obligations may be implemented to block or allow unusual flows. In certain embodiments, an XACML obligation may be implemented as a directive from a policy decision point (PDP) to a policy enforcement point (PEP) regarding what must be performed before or after a flow is approved. Certain embodiments of the invention reflect an appreciation that such an approach is highly applicable to defending against point-of-sale (POS) malware, a breach technique that has become increasingly more common in recent years. Certain embodiments of the invention likewise reflect an appreciation that while various edge device 202 implementations may not stop all such exfiltrations, they may be able to complicate the task for the attacker.

In certain embodiments, the security analytics system 118 may be primarily oriented to maximally leverage contextual information associated with various entity behaviors within the system. In certain embodiments, data flow tracking is performed by one or more endpoint agents 306, which allows the quantity and type of information associated with particular hosts to be measured. In turn, this information may be used to determine how the edge device 202 handles requests. By contextualizing such entity behavior on the network 140, the security analytics system 118 can provide intelligent protection, making decisions that make sense in the broader context of an organization's activities. Certain embodiments of the invention reflect an appreciation that one advantage to such an approach is that information flowing through an organization, and the networks they employ, should be trackable, and substantial data breaches preventable. Skilled practitioners of the art will recognize that many such embodiments and examples are possible. Accordingly, the foregoing is not intended to limit the spirit, scope or intent of the invention.

Figure 6:
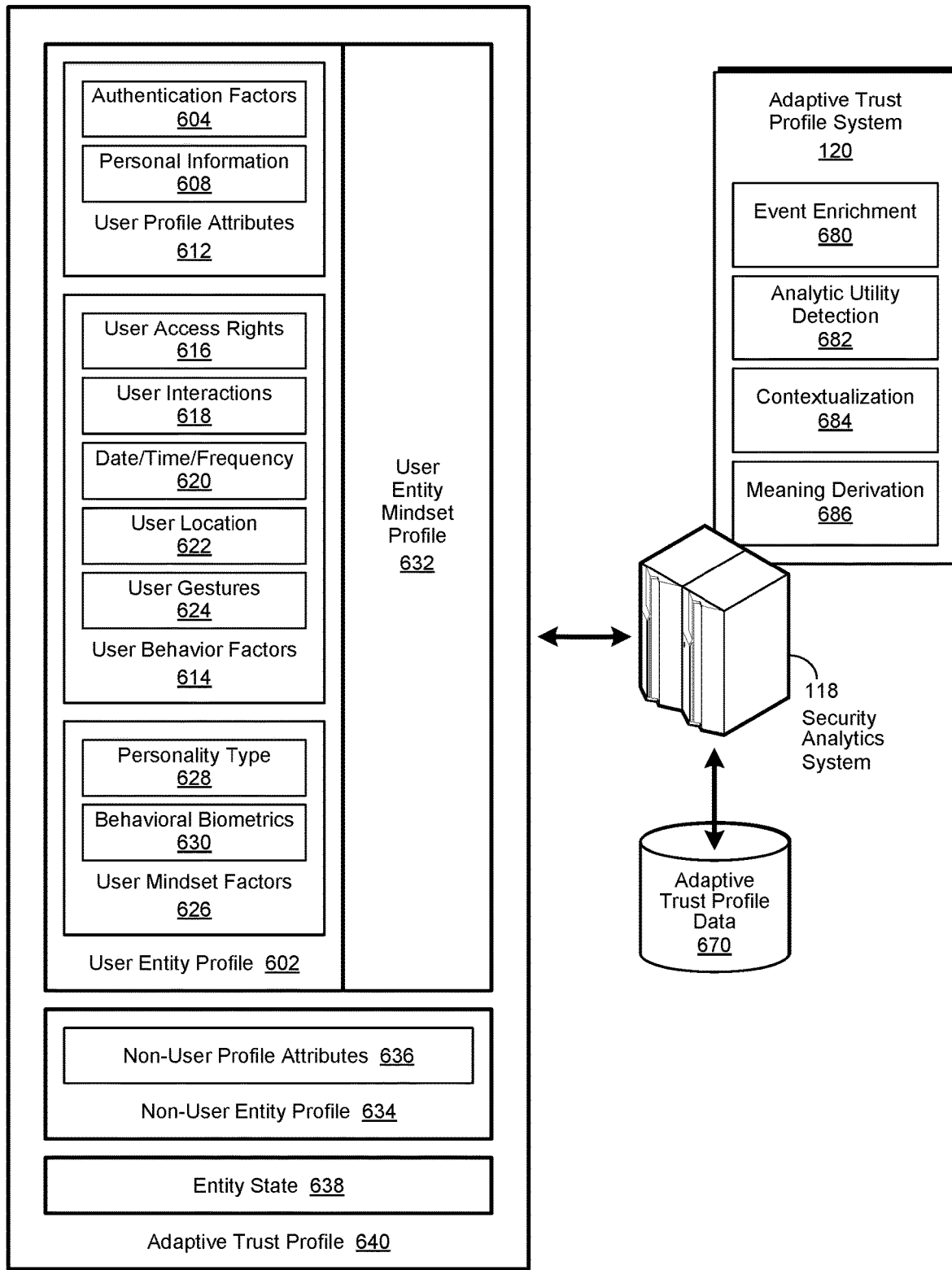
FIG. 6 is a simplified block diagram of an adaptive trust profile (ATP)

FIG. 6 is a simplified block diagram of an adaptive trust profile implemented in accordance with an embodiment of the invention. As used herein, an adaptive trust profile (ATP) 640 broadly refers to a collection of information that uniquely describes an entity's identity and their associated behavior, whether the behavior occurs within a physical realm or cyberspace. In certain embodiments, an ATP may be used to adaptively draw inferences regarding the trustworthiness of an entity. In certain embodiments, as described in greater detail herein, the drawing of the inferences may involve comparing a new entity behavior to known past behaviors enacted by the entity. In certain embodiments, new entity behavior of analytic utility may represent entity behavior that represents a security risk. As likewise used herein, an entity broadly refers to something that exists as itself, whether physically or abstractly. In certain embodiments, an entity may be a user entity, a non-user entity, or a combination thereof. In certain embodiments, the identity of an entity may be known or unknown.

As used herein, a user entity broadly refers to an entity capable of enacting a user behavior, as described in greater detail herein. Examples of a user entity include an individual person, a group of people, an organization, or a government. As likewise used herein, a non-user entity broadly refers to an entity whose identity can be described and may exhibit certain behavior, but is incapable of enacting a user behavior. Examples of a non-user entity include an item, a device, such as endpoint and edge devices, a network, an account, a domain, an operation, and a process. Other examples of a non-user entity include a resource, such as a geographical location or formation, a physical facility, a venue, a system, a software application, a data store, and a service, such as a service operating in a cloud environment.

Certain embodiments of the invention reflect an appreciation that being able to uniquely identity a device may assist in establishing whether or not a particular login is legitimate. As an example, user impersonations may not occur at the user's endpoint, but rather, from another device or system. Certain embodiments of the invention likewise reflect an appreciation that profiling the behavior of a particular device or system may assist in determining whether or not it is acting suspiciously.

In certain embodiments, an account may be local account, which runs on a single machine. In certain embodiments, an account may be a global account, providing access to multiple resources. In certain embodiments, a process may be implemented to run in an unattended mode, such as when backing up files or checking for software updates. Certain embodiments of the invention reflect an appreciation that it is often advantageous to track events at the process level as a method of determining which events are associated with background processes and which are initiated by a user entity.

In certain embodiments, an ATP 640 may be implemented to include a user entity profile 602, an associated user entity mindset profile 632, a non-user entity profile 634, and an entity state 638. As used herein, a user entity profile 602 broadly refers to a collection of information that uniquely describes a user entity's identity and their associated behavior, whether the behavior occurs within a physical realm or cyberspace. In certain embodiments, as described in greater detail herein, the user entity profile 602 may include user profile attributes 612, user behavior factors 614, user mindset factors 626, or a combination thereof. In certain embodiments, the user profile attributes 612 may include certain user authentication factors 604, described in greater detail herein, and personal information 608.

As used herein, a user profile attribute 612 broadly refers to data or metadata that can be used, individually or in combination with other user profile attributes 612, user behavior factors 614, or user mindset factors 626, to ascertain the identity of a user entity. In various embodiments, certain user profile attributes 612 may be uniquely associated with a particular user entity. In certain embodiments, the personal information 608 may include non-sensitive personal information associated with a user entity, such as their name, title, position, role, and responsibilities. In certain embodiments, the personal information 608 may likewise include technical skill level information, peer information, expense account information, paid time off (PTO) information, data analysis information, insider information, misconfiguration information, third party information, or a combination thereof. In certain embodiments, the personal information 608 may contain sensitive personal information associated with a user entity. As used herein, sensitive personal information (SPI), also commonly referred to as personally identifiable information (PII), broadly refers to any information usable to ascertain the identity of a user entity, either by itself, or in combination with other information, such as contextual information described in greater detail herein.

Examples of SPI may include the full or legal name of a user entity, initials or nicknames, place and date of birth, home and business addresses, personal and business telephone numbers, their gender, and other genetic information. Additional examples of SPI may include government-issued identifiers, such as a Social Security Number (SSN) or a passport number, vehicle registration plate and serial numbers, and driver's license numbers. Other examples of SPI may include certain email addresses and social media identifiers, credit and debit card numbers, and other digital identity information. Yet other examples of SPI may include employer-issued identifiers, financial transaction information, credit scores, electronic medical records (EMRs), insurance claim information, personal correspondence, and so forth. Further examples of SPI may include user authentication factors 604, such as biometrics, user identifiers and passwords, and personal identification numbers (PINs).

In certain embodiments, the SPI may include information considered by an individual user, a group of users, or an organization (e.g., a company, a government or non-government organization, etc.), to be confidential or proprietary. One example of such confidential information is protected health information (PHI). As used herein, PHI broadly refers to any information associated with the health status, provision of health care, or payment for health care that is created or collected by a "covered entity," or an associate thereof, that can be linked to a particular individual. As used herein, a "covered entity" broadly refers to health plans, healthcare clearinghouses, healthcare providers, and others, who may electronically communicate any health-related information associated with a particular individual. Examples of such PHI may include any part of a patient's medical record, healthcare record, or payment history for medical or healthcare services.

As used herein, a user behavior factor 614 broadly refers to information associated with a user entity's behavior, whether the behavior occurs within a physical realm or cyberspace. In certain embodiments, user behavior factors 614 may include the user entity's access rights 616, the user entity's interactions 618, and the date/time/frequency 620 of when the interactions 618 are enacted. In certain embodiments, the user behavior factors 614 may likewise include the user entity's location 622, and the gestures 624 used by the user entity to enact the interactions 618.

In certain embodiments, the user entity gestures 624 may include key strokes on a keypad, a cursor movement, a mouse movement or click, a finger swipe, tap, or other hand gesture, an eye movement, or some combination thereof. In certain embodiments, the user entity gestures 624 may likewise include the cadence of the user's keystrokes, the motion, force and duration of a hand or finger gesture, the rapidity and direction of various eye movements, or some combination thereof. In certain embodiments, the user entity gestures 624 may include various audio or verbal commands performed by the user.

As used herein, user mindset factors 626 broadly refer to information used to make inferences regarding the mental state of a user entity at a particular point in time, during the occurrence of an event or an enactment of a user behavior, or a combination thereof. As likewise used herein, mental state broadly refers to a hypothetical state corresponding to the way a user entity may be thinking or feeling. Likewise, as used herein, an event broadly refers to the occurrence of action performed by an entity. In certain embodiments, the user entity mindset factors 626 may include a personality type 628. Examples of known approaches for determining a personality type 628 include Jungian types, Myers-Briggs type indicators, Keirsy Temperament Sorter, Socionics, Enneagram of Personality, and Eyseneck's three-factor model.

In certain embodiments, the user mindset factors 626 may include various behavioral biometrics 630. As used herein, a behavioral biometric 626 broadly refers to a physiological indication of a user entity's mental state. Examples of behavioral biometrics 630 may include a user entity's blood pressure, heart rate, respiratory rate, eye movements and iris dilation, facial expressions, body language, tone and pitch of voice, speech patterns, and so forth.

Certain embodiments of the invention reflect an appreciation that certain user behavior factors 614, such as user entity gestures 624, may provide additional information related to inferring a user entity's mental state. As an example, a user entering text at a quick pace with a rhythmic cadence may indicate intense focus. Likewise, an individual user intermittently entering text with forceful keystrokes may indicate the user is in an agitated state. As another example, the user may intermittently enter text somewhat languorously, which may indicate being in a thoughtful or reflective state of mind. As yet another example, the user may enter text with a light touch with an uneven cadence, which may indicate the user is hesitant or unsure of what is being entered.

Certain embodiments of the invention likewise reflect an appreciation that while the user entity gestures 624 may provide certain indications of the mental state of a particular user entity, they may not provide the reason for the user entity to be in a particular mental state. Likewise, certain embodiments of the invention include an appreciation that certain user entity gestures 624 and behavioral biometrics 630 are reflective of an individual user's personality type 628. As an example, aggressive, forceful keystrokes combined with an increased heart rate may indicate normal behavior for a particular user when composing end-of-month performance reviews. In various embodiments, certain user entity behavior factors 614, such as user gestures 624, may be correlated with certain contextual information, as described in greater detail herein.

In certain embodiments, a security analytics system 118, described in greater detail herein, may be implemented to include an adaptive trust profile (ATP) system 120. In certain embodiments, the ATP system 120 may be implemented to use a user entity profile 602 in combination with an entity state 638 to generate a user entity mindset profile 632. As used herein, entity state 638 broadly refers to the context of a particular event or entity behavior. In certain embodiments, the entity state 638 may be a long-term entity state or a short-term entity state. As used herein, a long-term entity state 638 broadly relates to an entity state 638 that persists for an extended interval of time, such as six months or a year. As likewise used herein, a short-term entity state 638 broadly relates to an entity state 638 that occurs for a brief interval of time, such as a few minutes or a day. In various embodiments, the method by which an entity state's 638 associated interval of time is considered to be long-term or short-term is a matter of design choice.

As an example, a particular user may have a primary work location, such as a branch office, and a secondary work location, such as their company's corporate office. In this example, the user's primary and secondary offices respectively correspond to the user's location 622, whereas the presence of the user at either office corresponds to an entity state 638. To continue the example, the user may consistently work at their primary office Monday through Thursday, but at their company's corporate office on Fridays. To further continue the example, the user's presence at their primary work location may be a long-term entity state 638, while their presence at their secondary work location may be a short-term entity state 638. Accordingly, a date/time/frequency 620 user entity behavior factor 614 can likewise be associated with user behavior respectively enacted on those days, regardless of their corresponding locations. Consequently, the long-term user entity state 638 on Monday through Thursday will typically be "working at the branch office" and the short-term entity state 638 on Friday will likely be "working at the corporate office."

As likewise used herein, a user entity mindset profile 632 broadly refers to a collection of information that reflects an inferred mental state of a user entity at a particular time during the occurrence of an event or an enactment of a user behavior. As an example, certain information may be known about a user entity, such as their name, their title and position, and so forth, all of which are user profile attributes 612. Likewise, it may be possible to observe a user entity's associated user behavior factors 614, such as their interactions with various systems, when they log-in and log-out, when they are active at the keyboard, the rhythm of their keystrokes, and which files they typically use.

Certain embodiments of the invention reflect an appreciation these behavior factors 614 can be considered to be a behavioral fingerprint. In certain embodiments, the user behavior factors 614 may change, a little or a lot, from day to day. These changes may be benign, such as when a user entity begins a new project and accesses new data, or they may indicate something more concerning, such as a user entity who is actively preparing to steal data from their employer. In certain embodiments, the user behavior factors 614 may be implemented to ascertain the identity of a user entity. In certain embodiments, the user behavior factors 614 may be uniquely associated with a particular entity.

In certain embodiments, observed user behaviors may be used to build a user entity profile 602 for a particular user or other entity. In addition to creating a model of a user's various attributes and observed behaviors, these observations can likewise be used to infer things that are not necessarily explicit. Accordingly, in certain embodiments, a behavioral fingerprint may be used in combination with an ATP 640 to generate an inference regarding an associated user entity. As an example, a particular user may be observed eating a meal, which may or may not indicate the user is hungry. However, if it is also known that the user worked at their desk throughout lunchtime and is now eating a snack during a mid-afternoon break, then it can be inferred they are indeed hungry.

As likewise used herein, a non-user entity profile 634 broadly refers to a collection of information that uniquely describes a non-user entity's identity and their associated behavior, whether the behavior occurs within a physical realm or cyberspace. In various embodiments, the non-user entity profile 634 may be implemented to include certain non-user profile attributes 636. As used herein, a non-user profile attribute 636 broadly refers to data or metadata that can be used, individually or in combination with other non-user profile attributes 636, to ascertain the identity of a non-user entity. In various embodiments, certain non-user profile attributes 636 may be uniquely associated with a particular non-user entity.

In certain embodiments, the non-user profile attributes 636 may be implemented to include certain identity information, such as a non-user entity's network, Media Access Control (MAC), or physical address, its serial number, associated configuration information, and so forth. In various embodiments, the non-user profile attributes 636 may be implemented to include non-user behavior information associated with interactions between certain user and non-user entities, the type of those interactions, the data exchanged during the interactions, the date/time/frequency of such interactions, and certain services accessed or provided.

In certain embodiments, the ATP system 120 may be implemented to include an event enrichment 680 module, an analytic utility detection 682 module, a contextualization 684 module, and a meaning derivation 686 module, or a combination thereof. In various embodiments, the event enrichment 680 module may be implemented to perform certain event enrichment operations, described in greater detail herein. In various embodiments, the analytic utility detection 682 module may be implemented to perform certain analytic utility detection operations, as likewise described in greater detail herein. In various embodiments, as described in greater detail herein, the contextualization 684 module may be implemented to perform certain contextualization operations. As likewise described in greater detail herein, the meaning derivation 686 module may be implemented to perform certain meaning derivation operations. In various embodiments, the event enrichment 680 module, the meaning derivation 686 module, the contextualization 684 module, and the analytic utility detection 686 module provide an ATP reference architecture for performing various ATP operations, described in greater detail herein.

In various embodiments, as described in greater detail herein, the ATP system 120 may be implemented to use certain data associated with an ATP 640 to derive an inference for contextualizing an electronically-observable behavior of a corresponding entity. In certain embodiments, the ATP system 120 may be implemented to use a user profile 602 in combination with a user entity mindset profile 634 and an associated entity state 638 to infer a user entity's intent. In certain embodiments, the ATP system 120 may be implemented to use various data stored in a repository of ATP data 670 to perform such an inference. In certain embodiments, the repository of ATP data 670 may include various ATPs 640 and associated contextual information, described in greater detail herein.

In various embodiments, the ATP system 120 may be implemented to use certain data associated with an ATP 640 to provide a probabilistic measure of whether a particular electronically-observable event is of analytic utility. In certain embodiments, an electronically-observable event that is of analytic utility may be determined to be anomalous, abnormal, unexpected, or malicious. To continue the prior example, a user may typically work out of their company's corporate office on Fridays. Furthermore, various mindset factors 626 within their associated user entity profile 602 may indicate that the user is typically relaxed and methodical when working with customer data. Moreover, the user's user entity profile 602 indicates that such interactions 618 with customer data typically occur on Monday mornings and the user rarely, if ever, copies or downloads customer data. However, the user may decide to interact with certain customer data late at night, on a Friday, while in their company's corporate office. As they do so, they exhibit an increased heart rate, rapid breathing, and furtive keystrokes while downloading a subset of customer data to a flash drive.

Consequently, their user entity mindset profile 632 may reflect a nervous, fearful, or guilty mindset, which is inconsistent with the entity state 638 of dealing with customer data in general. More particularly, downloading customer data late at night on a day the user is generally not in their primary office results in an entity state 638 that is likewise inconsistent with the user's typical user behavior. As a result, the ATP system 120 may infer that the user's behavior may represent a security threat. Those of skill in the art will recognize that many such embodiments and examples are possible. Accordingly, the foregoing is not intended to limit the spirit, scope or intent of the invention.

Figure 7:
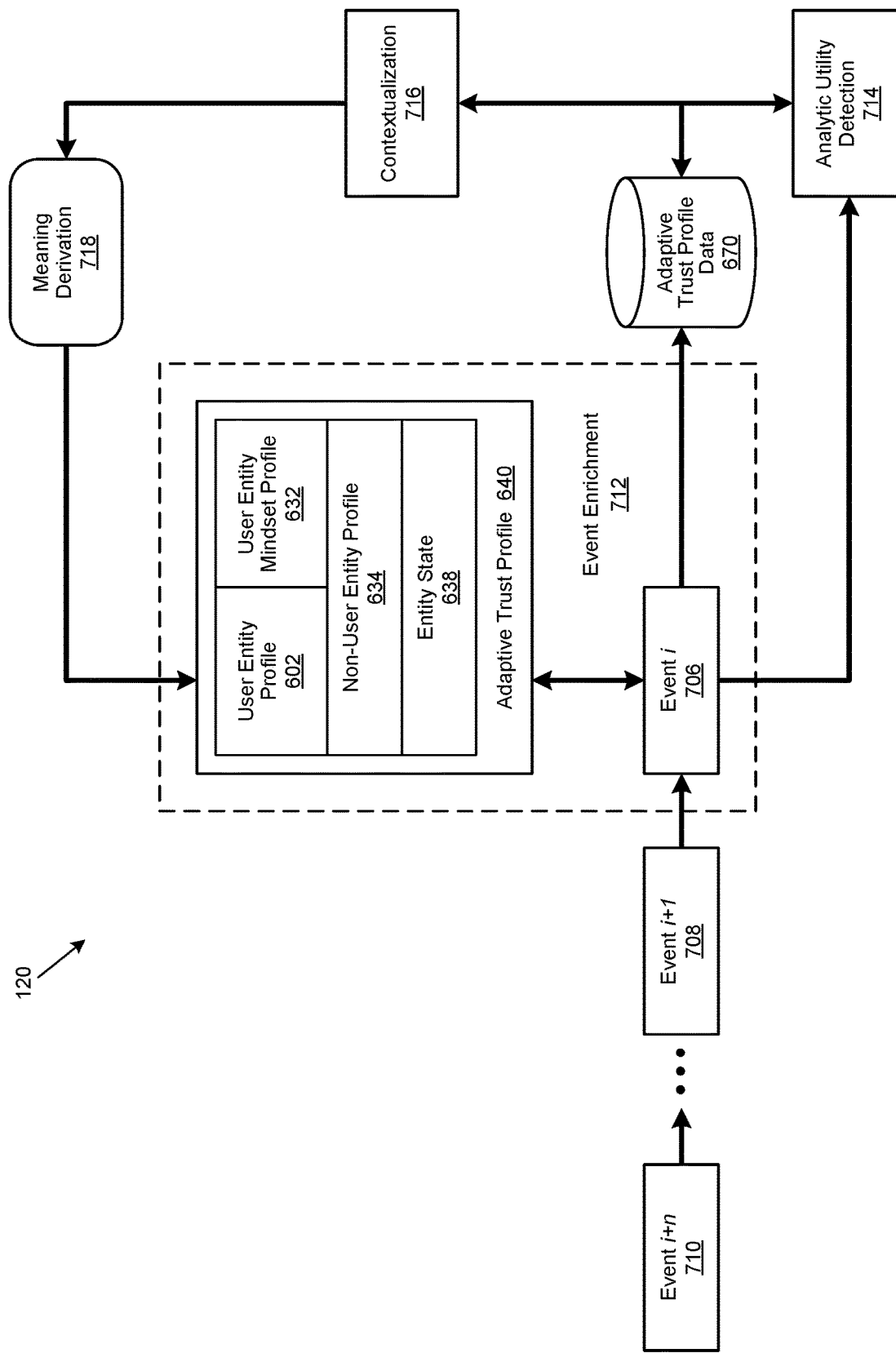
FIG. 7 is simplified block diagram of process flows associated with the operation of an ATP system.

FIG. 7 is simplified block diagram of process flows associated with the operation of an adaptive trust profile (ATP) system implemented in accordance with an embodiment of the invention. In certain embodiments, the ATP system 120 may be implemented to define and manage an ATP 640, as described in greater detail herein. In certain embodiments, the ATP 640 may be implemented to comprise a user entity profile 602, likewise described in greater detail herein. In certain embodiments, the ATP system 120 may be implemented use the resulting user entity profile 602 in combination with a particular entity state 638 to generate a user entity mindset profile 632, likewise described in greater detail herein. In certain embodiments, the ATP system 120 may be implemented to use the resulting user entity mindset profile 632 in combination with an associated user entity profile 602, non-user entity profile 634, and entity state 638 to detect entity behavior of analytic utility.

In certain embodiments, the ATP system 120 may be implemented to process certain entity information associated with defining and managing an ATP 640. As used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In certain embodiments, the metadata may include entity attributes, which in turn may include certain entity identifier types or classifications.

In various embodiments, the ATP system 120 may be implemented to use certain entity identifier information to ascertain the identity of an associated entity at a particular point in time. As used herein, entity identifier information broadly refers to an information element associated with an entity that can be used to ascertain or corroborate the identity of its corresponding entity at a particular point in time. In certain embodiments, the entity identifier information may include user authentication factors, user profile attributes, user behavior factors, user mindset factors, information associated with various endpoint and edge devices, networks, resources, or a combination thereof.

In certain embodiments, the entity identifier information may include temporal information. As used herein, temporal information broadly refers to a measure of time (e.g., a date, timestamp, etc.), a measure of an interval of time (e.g., a minute, hour, day, etc.), or a measure of an interval of time (e.g., two consecutive weekdays days, or between Jun. 3, 2017 and Mar. 4, 2018, etc.). In certain embodiments, the temporal information may be associated with an event associated with a particular point in time. As used herein, such a temporal event broadly refers to an occurrence, action or activity enacted by, or associated with, an entity at a particular point in time.

Examples of such temporal events include making a phone call, sending a text or an email, using a device, such as an endpoint device, accessing a system, and entering a physical facility. Other examples of temporal events include uploading, transferring, downloading, modifying, or deleting data, such as data stored in a datastore, or accessing a service. Yet other examples of temporal events include interactions between two or more users, interactions between a user and a device, interactions between a user and a network, and interactions between a user and a resource, whether physical or otherwise. Yet still other examples of temporal events include a change in name, address, physical location, occupation, position, role, marital status, gender, association, affiliation, or assignment.

As likewise used herein, temporal event information broadly refers to temporal information associated with a particular event. In various embodiments, the temporal event information may include certain types of content. In certain embodiments, such types of content may include text, unstructured data, structured data, graphical images, photographs, audio recordings, video recordings, and so forth. In certain embodiments, the entity information may include metadata. In various embodiments, the metadata may include temporal event attributes, which in turn may include certain entity identifier types or classifications, described in greater detail herein.

In certain embodiments, the ATP system 120 may be implemented to use information associated with such temporal resolution of an entity's identity to assess the risk associated with a particular entity, at a particular point in time, and adaptively respond with an associated response. In certain embodiments, the ATP system 120 may be implemented to respond to such assessments in order to reduce operational overhead and improve system efficiency while maintaining security integrity. In certain embodiments, the response to such assessments may be performed by a security administrator. Accordingly, certain embodiments of the invention may be directed towards assessing the risk associated with the affirmative resolution of the identity of an entity at a particular point in time in combination with its associated contextual information. Consequently, the ATP system 120 may be more oriented in various embodiments to risk adaptation than to security administration.

In certain embodiments, ATP 640 definition and management operations are begun with the receipt of information associated with event i 706. In certain embodiments, information associated with an initial event i 706 may include user profile attributes, user behavior factors, user mindset factors, entity state information, contextual information, described in greater detail herein, or a combination thereof. In various embodiments, certain user entity profile 602, user entity mindset profile 632, non-user entity profile 634, and entity state 638 data stored in a repository of ATP data 670 may be retrieved and then used to perform event enrichment 712 operations to enrich the information associated with event i 706. In certain embodiment, event enrichment 712 operations are performed by the event enrichment module 680 of the ATP system 120. Analytic utility detection 714 operations are then performed on the resulting enriched information associated with event i 706 to determine whether it is of analytic utility. In certain embodiments, analytic utility detection 714 operations are performed by the analytic utility detection module 682 of the ATP system 120.

In various embodiments, certain contextualization information stored in the repository of ATP data 670 may be retrieved and then used to perform contextualization 716 operations to provide context, based upon the entity's user entity profile 602 or non-user entity profile 634, and its associated entity state 638. In certain embodiments, contextualization 716 operations are performed by the contextualization module 684 of the ATP system 120. In certain embodiments, meaning derivation 718 operations are then performed on the contextualized information associated with event i 706 to derive meaning. In certain embodiments, meaning derivation 718 operations are performed by the meaning derivation module 686 of the ATP system. In certain embodiments, the derivation of meaning may include inferring the intent of an entity associated with event i 706. In certain embodiments, the resulting information associated with event i 706 is then used to update the user entity profile 602 or non-user entity profile 634 corresponding to the entity associated with event i 706. In certain embodiments, the process is iteratively repeated, proceeding with information associated with event i+1 708 through event i+n 710.

From the foregoing, skilled practitioners of the art will recognize that a user entity profile 602, or a non-user entity profile 634, or the two in combination, as implemented in certain embodiments, not only allows the identification of events associated with a particular entity that may be of analytic utility, but also provides higher-level data that allows for the contextualization of observed events. Accordingly, by viewing individual sets of events both in context and with a view to how they may be of analytic utility, it is possible to achieve a more nuanced and higher-level comprehension of an entity's intent.

Figure 8A:
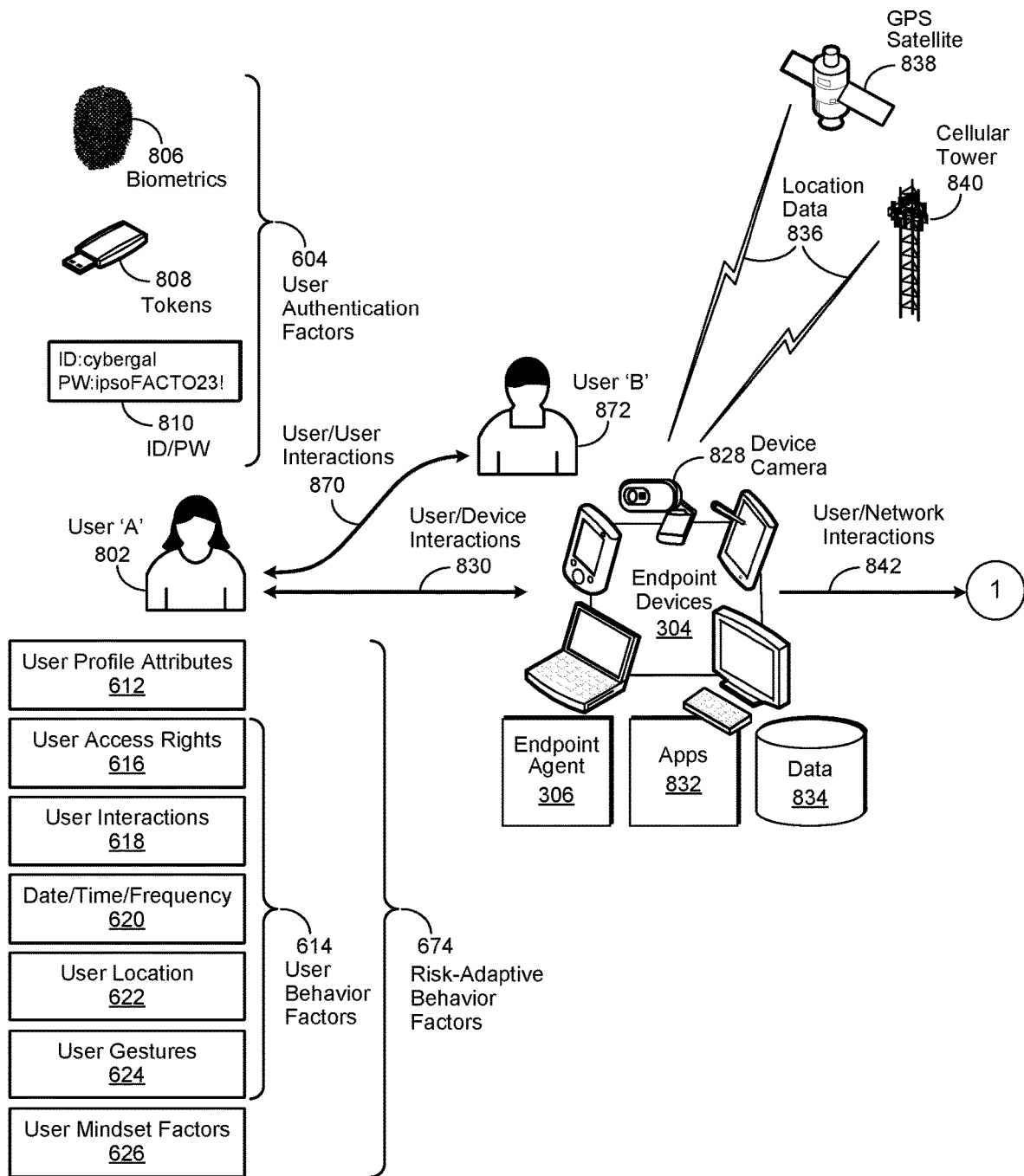
FIGS. 8a and 8b shows a block diagram of a security analytics system environment.
Figure 8B:
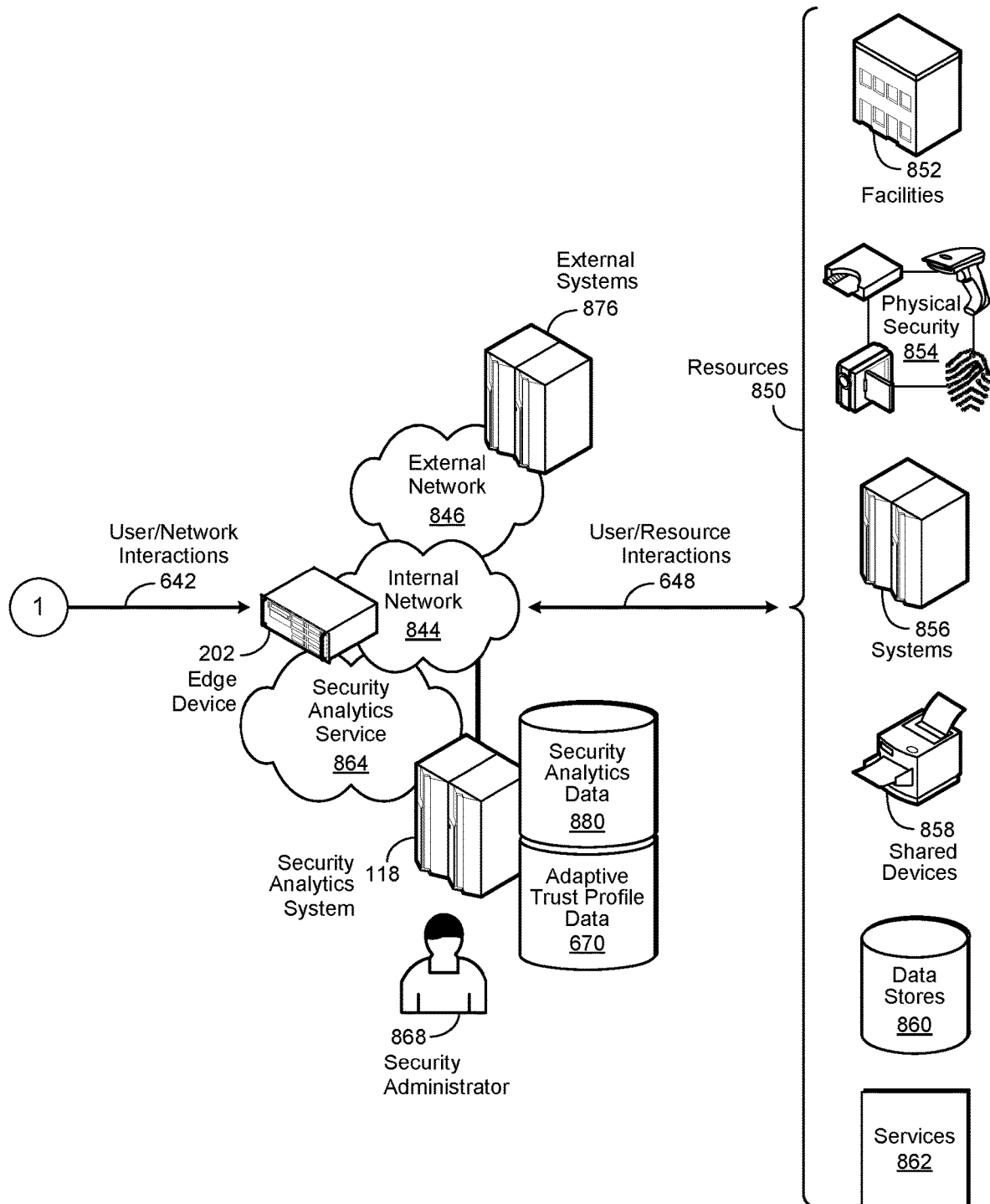

FIGS. 8a and 8b show a block diagram of a security analytics environment implemented in accordance with an embodiment of the invention. In certain embodiments, analyses performed by a security analytics system 118 may be used to identify behavior associated with a particular entity that may be of analytic utility. In certain embodiments, the entity behavior of analytic utility may be identified at a particular point in time, during the occurrence of an event, the enactment of a user or non-user behavior, or a combination thereof.

As used herein, an entity broadly refers to something that exists as itself, whether physically or abstractly. In certain embodiments, an entity may be a user entity, a non-user entity, or a combination thereof. In certain embodiments, a user entity may be an individual user, such as user 'A' 802 or 'B' 872, a group, an organization, or a government. In certain embodiments, a non-user entity may likewise be an item, a device, such as endpoint 304 and edge 202 devices, a network, such as an internal 844 and external 846 networks, a domain, an operation, or a process. In certain embodiments, a non-user entity may be a resource 850, such as a geographical location or formation, a physical facility 852, such as a venue, various physical security devices 854, a system 856, shared devices 858, such as printer, scanner, or copier, a data store 860, or a service 862, such as a service 862 operating in a cloud environment.

As likewise used herein, an event broadly refers to the occurrence of an action performed by an entity. In certain embodiments, the action may be directly associated with a user behavior, described in greater detail herein. As an example, a first user may attach a binary file infected with a virus to an email that is subsequently sent to a second user. In this example, the act of attaching the binary file to the email is directly associated with a user behavior enacted by the first user. In certain embodiments, the action may be indirectly associated with a user behavior. To continue the example, the recipient of the email may open the infected binary file, and as a result, infect their computer with malware. To further continue the example, the act of opening the infected binary file is directly associated with a user behavior enacted by the second user. However, the infection of the email recipient's computer by the infected binary file is indirectly associated with the described user behavior enacted by the second user.

In various embodiments, certain user authentication factors 604 may be used to authenticate the identity of a user entity. In certain embodiments, the user authentication factors 604 may be used to ensure that a particular user, such as user 'A' 802 or 'B' 872, is associated with their corresponding user entity profile, rather than a user entity profile associated with another user. In certain embodiments, the user authentication factors 604 may include a user's biometrics 606 (e.g., a fingerprint or retinal scan), tokens 608 (e.g., a dongle containing cryptographic keys), user identifiers and passwords (ID/PW) 610, and personal identification numbers (PINs).

In certain embodiments, information associated with such user behavior may be stored in a user entity profile, described in greater detail herein. In certain embodiments, the user entity profile may be stored in a repository of adaptive trust profile (ATP) data 670. In certain embodiments, as likewise described in greater detail herein, the user entity profile may include user profile attributes 612, user behavior factors 614, user mindset factors 626, or a combination thereof. As used herein, a user profile attribute 612 broadly refers to data or metadata that can be used, individually or in combination with other user profile attributes 612, user behavior factors 614, or user mindset factors 626, to ascertain the identity of a user entity. In various embodiments, certain user profile attributes 612 may be uniquely associated with a particular user entity.

As likewise used herein, a user behavior factor 614 broadly refers to information associated with a user's behavior, whether the behavior occurs within a physical realm or cyberspace. In certain embodiments, the user behavior factors 614 may include the user's access rights 616, the user's interactions 618, and the date/time/frequency 620 of those interactions 618. In certain embodiments, the user behavior factors 614 may likewise include the user's location 622 when the interactions 618 are enacted, and the user gestures 624 used to enact the interactions 618.

In various embodiments, certain date/time/frequency 620 user behavior factors 614 may be implemented as ontological or societal time, or a combination thereof. As used herein, ontological time broadly refers to how one instant in time relates to another in a chronological sense. As an example, a first user behavior enacted at 12:00 noon on May 17, 2017 may occur prior to a second user behavior enacted at 6:39 PM on May 18, 2018. Skilled practitioners of the art will recognize one value of ontological time is to determine the order in which various user behaviors have been enacted.

As likewise used herein, societal time broadly refers to the correlation of certain user profile attributes 612, user behavior factors 614, user mindset factors 626, or a combination thereof, to one or more instants in time. As an example, user 'A' 802 may access a particular system 856 to download a customer list at 3:47 PM on Nov. 3, 2017. Analysis of their user behavior profile indicates that it is not unusual for user 'A' 802 to download the customer list on a weekly basis. However, examination of their user behavior profile also indicates that user 'A' 802 forwarded the downloaded customer list in an email message to user 'B' 872 at 3:49 PM that same day. Furthermore, there is no record in their user behavior profile that user 'A' 802 has ever communicated with user 'B' 872 in the past. Moreover, it may be determined that user 'B' 872 is employed by a competitor. Accordingly, the correlation of user 'A' 806 downloading the customer list at one point in time, and then forwarding the customer list to user 'B' 872 at a second point in time shortly thereafter, is an example of societal time.

In a variation of the prior example, user 'A' 802 may download the customer list at 3:47 PM on Nov. 3, 2017. However, instead of immediately forwarding the customer list to user 'B' 872, user 'A' 802 leaves for a two week vacation. Upon their return, they forward the previously-downloaded customer list to user 'B' 872 at 9:14 AM on Nov. 20, 2017. From an ontological time perspective, it has been two weeks since user 'A' 802 accessed the system 856 to download the customer list. However, from a societal time perspective, they have still forwarded the customer list to user 'B' 872, despite two weeks having elapsed since the customer list was originally downloaded.

Accordingly, the correlation of user 'A' 802 downloading the customer list at one point in time, and then forwarding the customer list to user 'B' 872 at a much later point in time, is another example of societal time. More particularly, it may be inferred that the intent of user 'A' 802 did not change during the two weeks they were on vacation. Furthermore, user 'A' 802 may have attempted to mask an intended malicious act by letting some period of time elapse between the time they originally downloaded the customer list and when they eventually forwarded it to user 'B' 872. From the foregoing, those of skill in the art will recognize that the use of societal time may be advantageous in determining whether a particular entity behavior is of analytic utility. As used herein, mindset factors 626 broadly refer to information used to infer the mental state of a user at a particular point in time, during the occurrence of an event, an enactment of a user behavior, or combination thereof.

In certain embodiments, the security analytics system 118 may be implemented to process certain entity information, described in greater detail herein, associated with providing resolution of the identity of an entity at a particular point in time. In various embodiments, the security analytics system 118 may be implemented to use certain entity identifier information, likewise described in greater detail herein, to ascertain the identity of an associated entity at a particular point in time. In various embodiments, the entity identifier information may include certain temporal information, described in greater detail herein. In certain embodiments, the temporal information may be associated with an event associated with a particular point in time.

In certain embodiments, the security analytics system 118 may be implemented to use information associated with certain user behavior elements to resolve the identity of an entity at a particular point in time. A user behavior element, as used herein, broadly refers to a discrete element of a user entity's behavior during the performance of a particular operation in a physical realm, cyberspace, or a combination thereof. In certain embodiments, such user behavior elements may be associated with a user/device 830, a user/network 842, a user/resource 848, a user/user 860 interaction, or a combination thereof.

As an example, user 'A' 802 may use an endpoint device 304 to browse a particular web page on a news site on an external system 876. In this example, the individual actions performed by user 'A' 802 to access the web page are user behavior elements that constitute a user behavior. As another example, user 'A' 802 may use an endpoint device 304 to download a data file from a particular system 856. In this example, the individual actions performed by user 'A' 802 to download the data file, including the use of one or more user authentication factors 604 for user authentication, are user behavior elements that constitute a user behavior. In certain embodiments, the user/device 830 interactions may include an interaction between a user, such as user 'A' 802 or 'B' 872, and an endpoint device 304.

In certain embodiments, the user/device 830 interaction may include interaction with an endpoint device 304 that is not connected to a network at the time the interaction occurs. As an example, user 'A' 802 or 'B' 872 may interact with an endpoint device 304 that is offline, using applications 832, accessing data 834, or a combination thereof, it may contain. Those user/device 830 interactions, or their result, may be stored on the endpoint device 304 and then be accessed or retrieved at a later time once the endpoint device 304 is connected to the internal 844 or external 846 networks. In certain embodiments, an endpoint agent 306 may be implemented to store the user/device 830 interactions when the user device 304 is offline.

In certain embodiments, an endpoint device 304 may be implemented with a device camera 828. In certain embodiments, the device camera 828 may be integrated into the endpoint device 304. In certain embodiments, the device camera 828 may be implemented as a separate device configured to interoperate with the endpoint device 304. As an example, a webcam familiar to those of skill in the art may be implemented receive and communicate various image and audio signals to an endpoint device 304 via a Universal Serial Bus (USB) interface.

In certain embodiments, the device camera 828 may be implemented to capture and provide user/device 830 interaction information to an endpoint agent 306. In various embodiments, the device camera 828 may be implemented to provide surveillance information related to certain user/device 830 or user/user 870 interactions. In certain embodiments, the surveillance information may be used by the security analytics system 118 to detect behavior associated with a user entity, such as user 'A' 802 or user 'B' 872 that may be of analytic utility.

In certain embodiments, the endpoint device 304 may be used to communicate data through the use of an internal network 844, an external network 846, or a combination thereof. In certain embodiments, the internal 844 and the external 846 networks may include a public network, such as the Internet, a physical private network, a virtual private network (VPN), or any combination thereof. In certain embodiments, the internal 844 and external 846 networks may likewise include a wireless network, including a personal area network (PAN), based on technologies such as Bluetooth. In various embodiments, the wireless network may include a wireless local area network (WLAN), based on variations of the IEEE 802.11 specification, commonly referred to as WiFi. In certain embodiments, the wireless network may include a wireless wide area network (WWAN) based on an industry standard including various 3G, 4G and 5G technologies.

In certain embodiments, the user/user 870 interactions may include interactions between two or more user entities, such as user 'A' 802 and 'B' 872. In certain embodiments, the user/user interactions 870 may be physical, such as a face-to-face meeting, via a user/device 830 interaction, a user/network 842 interaction, a user/resource 648 interaction, or some combination thereof. In certain embodiments, the user/user 870 interaction may include a face-to-face verbal exchange. In certain embodiments, the user/user 870 interaction may include a written exchange, such as text written on a sheet of paper. In certain embodiments, the user/user 870 interaction may include a face-to-face exchange of gestures, such as a sign language exchange.

In certain embodiments, temporal event information associated with various user/device 830, user/network 842, user/resource 848, or user/user 870 interactions may be collected and used to provide real-time resolution of the identity of an entity at a particular point in time. Those of skill in the art will recognize that many such examples of user/device 830, user/network 842, user/resource 848, and user/user 870 interactions are possible. Accordingly, the foregoing is not intended to limit the spirit, scope or intent of the invention.

In various embodiments, the security analytics system 118 may be implemented to process certain contextual information in the performance of certain security analytic operations. As used herein, contextual information broadly refers to any information, directly or indirectly, individually or in combination, related to a particular entity behavior. In certain embodiments, entity behavior may include a user entity's physical behavior, cyber behavior, or a combination thereof. As likewise used herein, a user entity's physical behavior broadly refers to any user behavior occurring within a physical realm, such as speaking, gesturing, facial patterns or expressions, walking, and so forth. More particularly, such physical behavior may include any action enacted by an entity user that can be objectively observed, or indirectly inferred, within a physical realm. In certain embodiments, the objective observation, or indirect inference, of the physical behavior may be performed electronically.

As an example, a user may attempt to use an electronic access card to enter a secured building at a certain time. In this example, the use of the access card to enter the building is the action and the reading of the access card makes the user's physical behavior electronically-observable. As another example, a first user may physically transfer a document to a second user, which is captured by a video surveillance system. In this example, the physical transferal of the document from the first user to the second user is the action. Likewise, the video record of the transferal makes the first and second user's physical behavior electronically-observable. As used herein, electronically-observable user behavior broadly refers to any behavior exhibited or enacted by a user entity that can be observed through the use of an electronic device (e.g., an electronic sensor), a computing device or system (e.g., an endpoint 304 or edge 202 device, a physical security device 854, a system 856, a shared device 858, etc.), computer instructions (e.g., a software application), or a combination thereof.

Cyber behavior, as used herein, broadly refers to any behavior occurring in cyberspace, whether enacted by an individual user, a group of users, or a system acting at the behest of an individual user, a group of users, or other entity. More particularly, cyber behavior may include physical, social, or mental actions that can be objectively observed, or indirectly inferred, within cyberspace. As an example, a user may use an endpoint device 304 to access and browse a particular website on the Internet. In this example, the individual actions performed by the user to access and browse the website constitute a cyber behavior. As another example, a user may use an endpoint device 304 to download a data file from a particular system 856 at a particular point in time. In this example, the individual actions performed by the user to download the data file, and associated temporal information, such as a time-stamp associated with the download, constitute a cyber behavior. In these examples, the actions are enacted within cyberspace, in combination with associated temporal information, which makes them electronically-observable.

In certain embodiments, the contextual information may include location data 836. In certain embodiments, the endpoint device 304 may be configured to receive such location data 836, which is used as a data source for determining the user's location 622. In certain embodiments, the location data 836 may include Global Positioning System (GPS) data provided by a GPS satellite 838. In certain embodiments, the location data 836 may include location data 836 provided by a wireless network, such as from a cellular network tower 840. In certain embodiments (not shown), the location data 836 may include various Internet Protocol (IP) or other network address information assigned to the endpoint 304 or edge 202 device. In certain embodiments (also not shown), the location data 836 may include recognizable structures or physical addresses within a digital image or video recording.

In certain embodiments, the endpoint devices 304 may include an input device (not shown), such as a keypad, magnetic card reader, token interface, biometric sensor, and so forth. In certain embodiments, such endpoint devices 304 may be directly, or indirectly, connected to a particular facility 852, physical security device 854, system 856, or shared device 858. As an example, the endpoint device 304 may be directly connected to an ingress/egress system, such as an electronic lock on a door or an access gate of a parking garage. As another example, the endpoint device 304 may be indirectly connected to a physical security device 854 through a dedicated security network.

In certain embodiments, the security analytics system 118 may be implemented to perform various risk-adaptive protection operations. Risk-adaptive, as used herein, broadly refers to adaptively responding to risks associated with an electronically-observable entity behavior. In various embodiments, the security analytics system 118 may be implemented to perform certain risk-adaptive protection operations by monitoring certain entity behaviors, assess the corresponding risk they may represent, individually or in combination, and respond with an associated response. In certain embodiments, such responses may be based upon contextual information, described in greater detail herein, associated with a given entity behavior.

In certain embodiments, various risk-adaptive behavior factors 674, likewise described in greater detail herein, may be used to perform the risk-adaptive protection operations. In certain embodiments, the risk-adaptive behavior factors 674 may include user profile attributes 612, user behavior factors 614, user mindset factors 626, or a combination thereof. In these embodiments, the risk-adaptive behavior factors 674 used to perform the risk-adaptive protection operations is a matter of design choice.

In certain embodiments, the security analytics system 118 may be implemented as a stand-alone system. In certain embodiments, the security analytics system 118 may be implemented as a distributed system. In certain embodiment, the security analytics system 118 may be implemented as a virtual system, such as an instantiation of one or more virtual machines (VMs). In certain embodiments, the security analytics system 118 may be implemented as a security analytics service 864. In certain embodiments, the security analytics service 864 may be implemented in a cloud environment familiar to those of skill in the art. In various embodiments, the security analytics system 118 may use data stored in a repository of security analytics data 880 in the performance of certain security analytics operations, described in greater detail herein. Those of skill in the art will recognize that many such embodiments are possible. Accordingly, the foregoing is not intended to limit the spirit, scope or intent of the invention.

Figure 9:
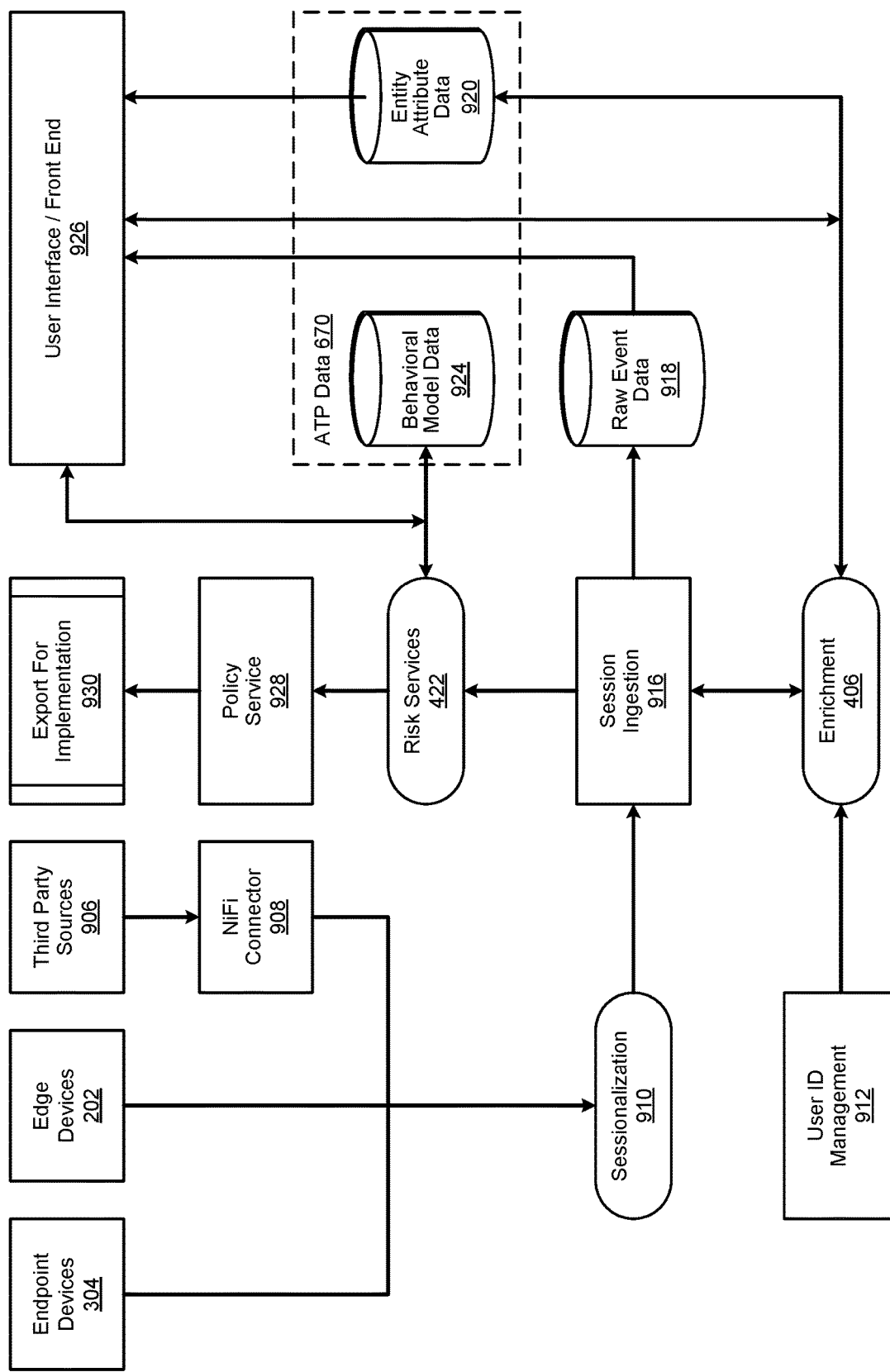
FIG. 9 shows a functional block diagram of the operation of an ATP system.

FIG. 9 shows a functional block diagram of an adaptive trust profile (ATP) system implemented in accordance with an embodiment of the invention. In various embodiments, certain ATP-related information, described in greater detail herein, may be provided by endpoint devices 304, edge devices 202, and third party sources 906. In certain embodiments, the receipt of ATP information provided by third party sources 906 may be facilitated through the implementation of one or more Apache NiFi connectors 908, familiar to skilled practitioners of the art. In certain embodiments, sessionalization operations are performed in block 910 on the ATP-related information provided by the endpoint devices 304, edge devices 202, and third party sources 906 to generate discrete sessions. In these embodiments, the method by which ATP-related information is selected to be used in the generation of a particular session, and the method by which the session is generated, is a matter of design choice.

As used herein, a session broadly refers to an interval of time during which one or more user or non-user behaviors are respectively enacted by a user or non-user entity. In certain embodiments, the user or non-user behaviors enacted during a session may be respectively associated with one or more events, described in greater detail herein. In certain embodiments, a session may be implemented to determine whether or not user or non-user behaviors enacted during the session are of analytic utility. As an example, certain user or non-user behaviors enacted during a particular session may indicate the behaviors were enacted by an impostor. As another example, certain user or non-user behaviors enacted during a particular session may be performed by an authenticated entity, but the behaviors may be unexpected or out of the norm.

In certain embodiments, two or more sessions may be contiguous. In certain embodiments, two or more sessions may be noncontiguous, but associated. In certain embodiments, a session may be associated with two or more other sessions. In certain embodiments, a session may be a subset of another session. In certain embodiments, the interval of time corresponding to a first session may overlap an interval of time corresponding to a second session. In certain embodiments, a session may be associated with two or more other sessions whose associated intervals of time may overlap one another. Skilled practitioners of the art will recognize that many such embodiments are possible. Accordingly, the foregoing is not intended to limit the spirit, scope or intent of the invention.

The resulting sessions are then ingested in block 916, followed by the performance of data enrichment operations familiar to those of skill in the art in block 914. In certain embodiments, user identifier information (ID) information provided by a user ID management system 912 may be used in block 914 to perform the data enrichment operations. In various embodiments, certain contextual information related to a particular entity behavior or event may be used in block 914 to perform the data enrichment operations. In various embodiments, certain temporal information, such as timestamp information, related to a particular entity behavior or event may be used in block 914 to perform the data enrichment operations. In certain embodiments, a repository of ATP data 970 may be implemented to include repositories of entity attribute data 920 and behavioral model data 924. In various embodiments, certain information stored in the repository of entity attribute data 920 may be used to perform the data enrichment operations in block 914.

In certain embodiments, the resulting enriched sessions may be stored in a repository of raw event data 918. In certain embodiments, the resulting enriched sessions may be provided to a risk services 422 module, described in greater detail herein. In certain embodiments, as likewise described in greater detail herein, the risk services 422 module may be implemented to generate inferences, risk models, and risk scores, or a combination thereof. In certain embodiments, the resulting inferences, risk models, or risk scores may then be stored in the repository of behavioral model data.

In certain embodiments, the risk services 422 module may be implemented to provide input data associated with the inferences, risk models, and risk scores it may generate to a policy service 928. In certain embodiments, the policy service 928 may be implemented to use the inferences, risk models, and risk scores to generate policies. In turn, the policy service 928 may be implemented in certain embodiments to export the resulting policies to endpoint agents, edge devices, or other security mechanisms, where they may be used to limit risk, as described in greater detail herein. In certain embodiments, a user interface (UI) or front-end 926 familiar to skilled practitioners of the art may be implemented to provide administrative access to various components of the ATP system 120, as shown in FIG. 9.

FIG. 10 is a table showing components of an adaptive trust profile (ATP) implemented in accordance with an embodiment of the invention. In various embodiments, an ATP 640 may be implemented to certain include entity attributes 1004, behavioral models 1006, and inferences 1008, along with entity state 638. In certain embodiments, an ATP's 640 entity state 638 may be short-term, or reflect the state of an entity at a particular point or interval in time. In certain embodiments, an ATP's 640 entity state 638 may be long-term, or reflect the state of an entity at recurring points or intervals in time.

In certain embodiments, an ATP's 640 associated entity attributes 1004 may be long-lived. As an example, a particular user entity may have a name, an employee ID, an assigned office, and so forth, all of which are facts rather than insights. In certain embodiments, a particular entity state 638 may be sufficiently long-termed to be considered an entity attribute 1004. As an example, a first user and a second user may both have an entity state 638 of being irritable. However, the first user may have a short-term entity state 638 of being irritable on an infrequent basis, while the second user may have a long-term entity state 638 of be irritable on a recurring basis. In this example, the long-term entity state 638 of the second user being irritable may be considered to be an entity attribute. In various embodiments, the determination of what constitutes an entity state 638 and an entity attribute 1004 is a matter of design choice. In certain embodiments, various knowledge representation approaches may be implemented in combination with an ATP system to understand the ontological interrelationship of entity attributes 1004 one or more ATP's 640 may contain. In these embodiments, the method by which certain entity attributes 1004 are selected to be tracked by an ATP system, and the method by which they are managed within a corresponding ATP 640, is a matter of design choice.

In certain embodiments, the ATP 640 evolves over time as new events and entity behavior is detected. In certain embodiments, an ATP's 640 associated behavioral models 1006, and thus the ATP 640 itself may evolve over time. In certain embodiments, an ATP's 640 behavioral models 1006 may be used by an ATP system to provide insight into how unexpected a set of events may be. As an example, a behavioral model 1006 may include information related to where a particular user entity works, which devices they may use and locations they may login from, who they may communicate with, and so forth. Certain embodiments of the invention reflect an appreciation that such behavioral models 1006 can be useful when comparing observe user and non-user behaviors to past observations in order to determine how unusual a particular action may be.

For example, a user may have more than one ATP 640 associated with a particular channel, which as used herein broadly refers to a medium capable of supporting the electronic observation of a user or non-user behavior, such as a keyboard, a network, a video stream, and so forth. To continue the example, the user may have a particular set of people he sends emails to from his desktop computer, and does so in an orderly and methodical manner, carefully choosing his words, and writing longer than average messages compared to his peers. Consequently, analysis of such an email message will likely indicate it was authored by the user and not someone else.

However, the same user may also send emails from a second channel, which is his mobile telephone. When using his mobile telephone, the user's emails are typically short, contains typos and emojis, and his writing style is primarily limited to simple confirmations or denials. Consequently, analysis of one such email would likely not reveal whether the user was the author or not, due to its brevity. Accordingly, the use of the same channel, which in this example is email, demonstrates the use of different devices will likely generate different behavioural models 1006, which in turn could affect the veracity of associated inferences 1008.

In certain embodiments, a behavioral model 1006 may be implemented as a session-based fingerprint. As used herein, a session-based fingerprint broadly refers to a unique identifier of an enactor of user or non-user behavior associated with a session. In certain embodiments, the session-based fingerprint may be implemented to determine how unexpected an event may be, based upon an entity's history as it relates to the respective history of their peer entities. In certain embodiments, the session-based fingerprint may be implemented to determine whether an entity associated with a particular session is truly who they or it claims to be or if they are being impersonated. In certain embodiments, the session-based fingerprint may be implemented to determine whether a particular event, or a combination thereof, may be of analytic utility. In certain embodiments, the session-based fingerprint may include a risk score, be used to generate a risk score, or a combination thereof.

As likewise used herein, a fingerprint, as it relates to a session, broadly refers to a collection of information providing one or more distinctive, characteristic indicators of the identity of an enactor of one or more corresponding user or non-user entity behaviors during the session. In certain embodiments, the collection of information may include one or more user or non-user profile elements. A user or non-user profile element, as used herein, broadly refers to a collection of user or non-user entity behavior elements, described in greater detail herein.

As used herein, inferences 1008 broadly refer to things that can be inferred about an entity based upon observations. In certain embodiments the observations may be based upon electronically-observable behavior, described in greater detail herein. In certain embodiments, the behavior may be enacted by a user entity, a non-user entity, or a combination thereof. In certain embodiments, inferences 1008 may be used to provide insight into a user entity's mindset or affective state.

As an example, an inference 1008 may be made that a user is unhappy in their job or that they are facing significant personal financial pressures. Likewise, based upon the user's observed behavior, an inference 1008 may be made that they are at a higher risk of being victimized by phishing schemes due to a propensity for clicking on random or risky website links. In certain embodiments, such inferences 1008 may be implemented to generate a predictive quantifier of risk associated with an entity's behavior.

In certain embodiments, entity state 638, described in greater detail herein, may be implemented such that changes in state can be accommodated quickly while reducing the overall volatility of a particular ATP 640. As an example, a user may be traveling by automobile. Accordingly, the user's location is changing quickly. Consequently, location data is short-lived. As a result, while the location of the user may not be updated within their associated ATP 640 as it changes, the fact their location is changing may prove to be useful in terms of interpreting other location-based data from other sessions. To continue the example, knowing the user is in the process of changing their location may assist in explaining why the user appears to be in two physical locations at once.

FIG. 11 is a table showing analytic utility actions occurring during a session implemented in accordance with an embodiment of the invention. In certain embodiments, an adaptive trust profile (ATP) system, described in greater detail herein, may be implemented to capture and record various actions 1104 enacted by an entity during a session 1102, likewise described in greater detail herein. In certain embodiments, the actions, and their associated sessions, may be stored in an ATP corresponding to a particular entity. In various embodiments, the ATP system may be implemented to process information stored in an ATP to determine, as described in greater detail herein, which actions 1104 enacted by a corresponding entity during a particular session 1102 may be of analytic utility 1108.

Certain embodiments of the invention reflect an appreciation that multiple sessions 1102, each of which may be respectively associated with a corresponding entity, may occur within the same interval of time 1106. Certain embodiments of the invention likewise reflect an appreciation that a single action of analytic utility 1108 enacted by an entity occurring during a particular interval of time 1106 may not appear to be suspicious behavior by an associated entity. Likewise, certain embodiments of the invention reflect an appreciation that the occurrence of multiple actions of analytic utility 1108 enacted by an entity during a particular session 1102 may be an indicator of suspicious behavior.

Certain embodiments reflect an appreciation that a particular entity may be associated with two or more sessions 1102 that occur concurrently over a period of time 1106. Certain embodiments of the invention likewise reflect an appreciation that a single action of analytic utility 1108 enacted by an entity occurring during a first session 1102 may not appear to be suspicious. Conversely, certain embodiments of the invention reflect an appreciation that multiple actions of analytic utility 1108 during a second session 1102 may.

As an example, a user may log into the same system from two different IP addresses, one associated with their laptop computer and the other their mobile phone. In this example, actions 1104 enacted by the user using their laptop computer may be associated with a first session 1102 (e.g. session '2'), and actions 1104 enacted by the user using their mobile phone may be associated with a second session 1102 (e.g., session '3'). To continue the example, only one action of analytic utility 1108 may be associated with the first session 1102, while three actions of analytic utility 1108 may be associated with the second session 1102. Accordingly, it may be inferred the preponderance of actions of analytic utility 1108 enacted by the user during the second session 1102 may indicate suspicious behavior being enacted with their mobile phone.

Figure 12:
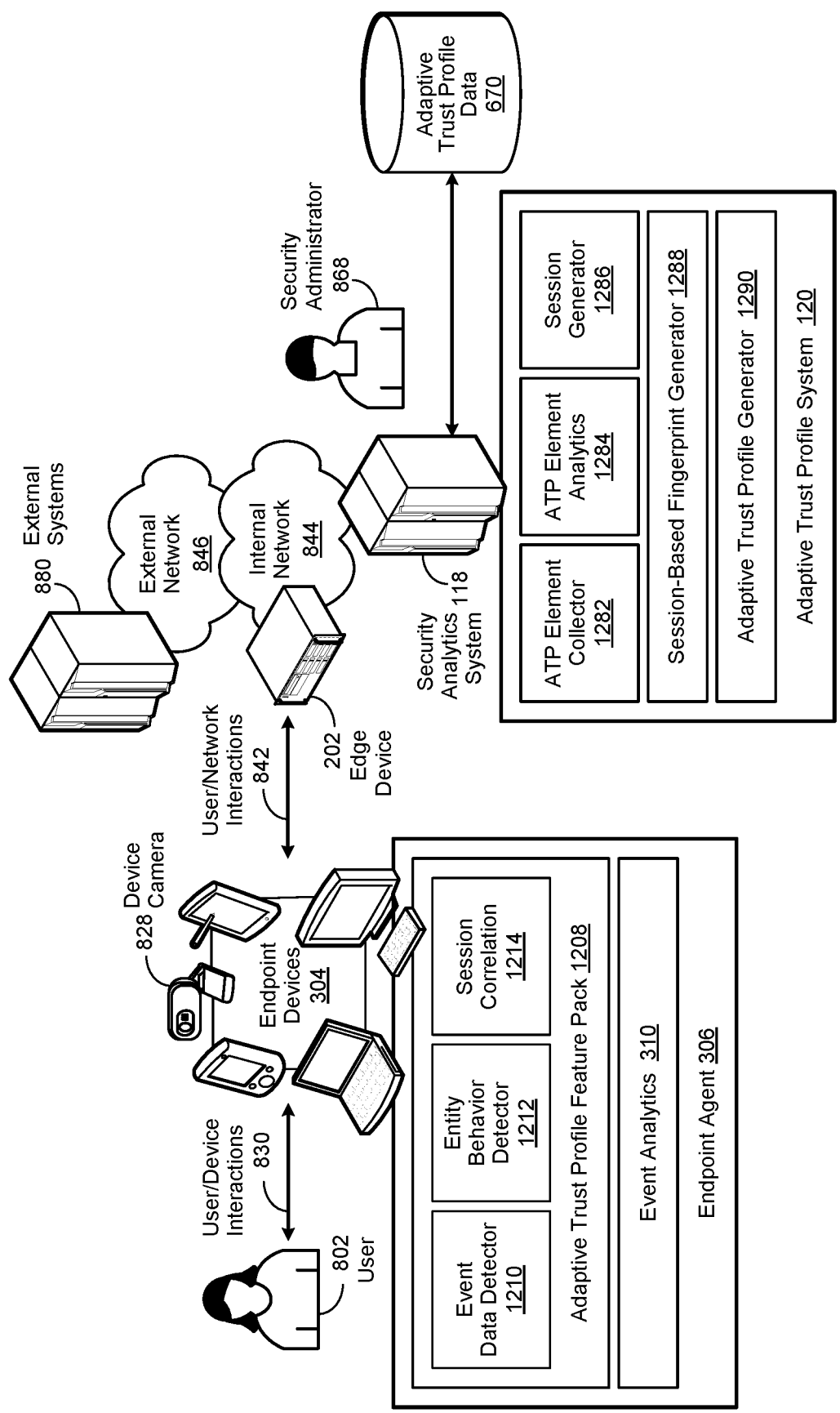
FIG. 12 is a simplified block diagram of an ATP system environment.

FIG. 12 is a simplified block diagram of an adaptive trust profile (ATP) system environment implemented in accordance with an embodiment of the invention. In certain embodiments, the ATP system environment may be implemented to detect user or non-user entity behavior of analytic utility and adaptively respond to mitigate risk. In certain embodiments, the ATP system environment may be implemented to include a security analytics system 118. In certain embodiments, the security analytics system 118 may be implemented to include an ATP system 120.

In certain embodiments, the ATP system 120, as described in greater detail herein, may be implemented to use session-based security information to generate an ATP, likewise describe in greater detail herein. As used herein, session-based security information broadly refers to any information associated with a session that can be used to detect entity behavior of analytic utility and mitigate its associated risk. In certain embodiments, the session-based security information may include a session-based fingerprint, described in greater detail herein.

In certain embodiments, the security analytics system 118 may be implemented to use one or more session-based fingerprints to perform security analytics operations to detect such user or non-user entity behavior. In certain embodiments, the security analytics system 118 may be implemented to monitor user behavior associated with a user entity, such as a user 802. In certain embodiments, the user or non-user entity behavior is monitored during user/device 830, user/network 842, user/resource 848, and user/user 860 interactions. In certain embodiments, the user/user 860 interactions may occur between a first user, such as a first user 802 and a second user 802.

In certain embodiments, as described in greater detail herein, an endpoint agent 306 may be implemented on the endpoint device 304 to perform user or non-user entity behavior monitoring. In certain embodiments, the user or non-user entity behavior may be monitored by the endpoint agent 306 during user/device 830 interactions between a user entity, such as a user 802, and an endpoint device 304. In certain embodiments, the user or non-user entity behavior may be monitored by the endpoint agent 306 during user/network 842 interactions between user 'A' 902 and a network, such as an internal 844 or external 846 network. In certain embodiments, the monitoring of user or non-user entity behavior by the endpoint agent 306 may include the monitoring of electronically-observable actions respectively enacted by a particular user or non-user entity. In certain embodiments, the endpoint agent 306 may be implemented in combination with the security analytics system 118 and the ATP system 120 to detect entity behavior of analytic utility and adaptively respond to mitigate risk.

In certain embodiments, the endpoint agent 306 may be implemented to include an analytics 310 module and an ATP feature pack 1208. In certain embodiments, the ATP feature pack 1208 may be further implemented to include an event data detector 1210 module, an entity behavior detector 1212 module, and a session correlation 1214 module. In certain embodiments, the event data detector 1210 module may be implemented to detect event data, described in greater detail herein, resulting from user/device 830, user/network 842, user/resource 848, and user/user 860 interactions. In various embodiments, the entity behavior detector 1212 module may be implemented to detect certain user and non-user entity behaviors, described in greater detail herein, resulting from user/device 830, user/network 842, user/resource 848, and user/user 860 interactions.

In various embodiments, the session correlation 1214 module may be implemented to generate session data by correlating certain event behavior data detected by the event data detector 1210 module with a particular session. In various embodiments, the session correlation 1214 module may be implemented to generate session data by correlating certain user and non-user entity behavior data detected by the entity behavior detector 1212 module with a particular session. In certain embodiments, the endpoint agent 306 may be implemented to communicate the event data detected by the event data detector 1210 module, the user and non-user entity behavior data detected by the entity behavior detector 1212 module, the session data generated by the session data detector 1214 module, or a combination thereof, to the security analytics 118 system.

In certain embodiments, the security analytics system 118 may be implemented to receive the event data, the user and non-user entity behavior data, and the session data provided by the endpoint agent 306. In certain embodiments, the security analytics system 118 may be implemented to provide the event data, the user and non-user entity behavior data, and the session data to the ATP system 120 for processing. In certain embodiment, the ATP system 120 may be implemented to include an ATP element collector 1282 module, an ATP element analytics 1284 module, a session generator 1286 module, a session-based fingerprint generator 1288 module, an ATP generator 1290 module, or a combination thereof.

In certain embodiments, the ATP element collector 1282 module may be implemented to process the event data, the user and non-user entity behavior data, and the session data provided by the endpoint agent 306 to generate ATP elements, described in greater detail herein. In various embodiments, the ATP element analytics 1284 module may be implemented to analyze certain ATP elements to detect possible user or non-user entity behavior of analytic utility associated with a particular event. In certain embodiments, the ATP session generator 1286 module may be implemented to process the ATP elements collected by the ATP element collector 1282 module to generate one or more associated sessions. In certain embodiments, the session-based fingerprint generator 1288 module may be implemented to process the sessions generated by the session generator 1286 module to generate one or more session-based fingerprints. In certain embodiments, the ATP generator 1290 module may be implemented to process the sessions generated by the ATP session generator 1286 module, the session-based fingerprints generated by the session-based fingerprint generator 1288 module, or a combination thereof, to generate am ATP profile, as described in greater detail herein.

Figure 13:
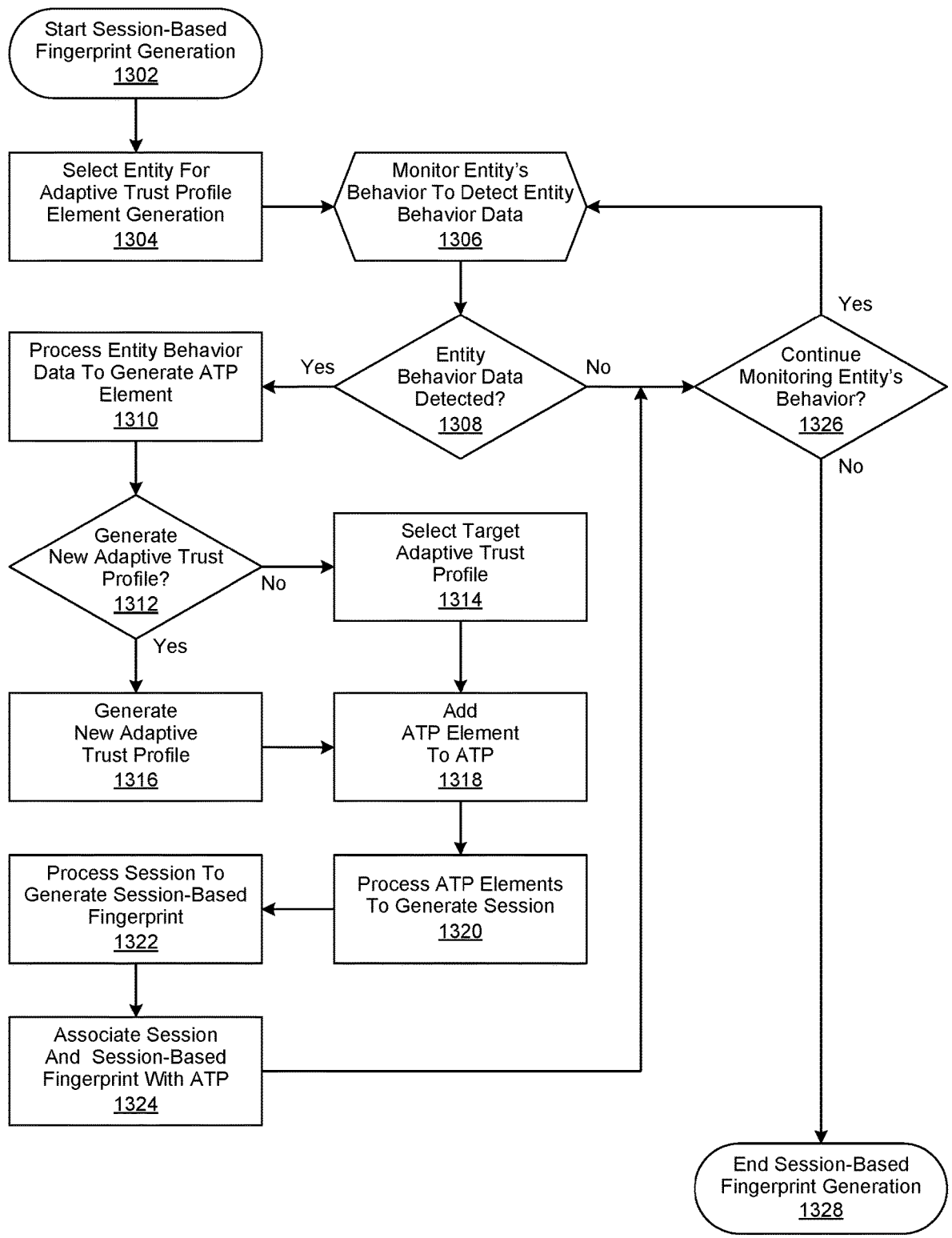
FIG. 13 is a generalized flowchart of the performance of session-based fingerprint generation operations.

FIG. 13 is a generalized flowchart of session-based fingerprint generation operations performed in accordance with an embodiment of the invention. In this embodiment, session-based fingerprint generation operations are begun in step 1302, followed by the selection of an entity in step 1304 for associated adaptive trust profile (ATP) element generation. As used herein, an ATP element broadly refers to any data element stored in an ATP, as described in greater detail herein. Ongoing monitoring operations are then performed in step 1306 to entity behavior data associated with the entity selected in step 1304.

A determination is then made in step 1308 whether entity behavior data has been detected. If not, then a determination is made in step 1326 whether to continue monitoring the entity's behavior to detect associated entity behavior data. If so, then the process is continued, proceeding with step 1306.

Otherwise, session-based fingerprint generation operations are ended in step 1328. However, if it was determined in step 1308 that entity behavior data was detected, then the detected entity data is processed in step 1310 to generate an associated ATP element.

A determination is then made in step 1312 whether to generate a new ATP for the entity. If not, then a target ATP associated with the entity is selected in step 1314. Otherwise, a new ATP for the entity is generated in step 1316. Thereafter, or once a target ATP associated with the entity has been selected in step 1315, the previously-generated ATP element is added to the selected or newly-generated ATP in step 1318.

The ATP elements within the ATP are then processed in step 1320 to generate a session, described in greater detail herein. The resulting session is in turn processed in step 1322 to generate a corresponding session-based fingerprint. The session and its corresponding session-based fingerprint are then associated with the ATP in step 1324 that is likewise associated with the entity. The process is then continued, proceeding with step 1326.

Figure 14A:
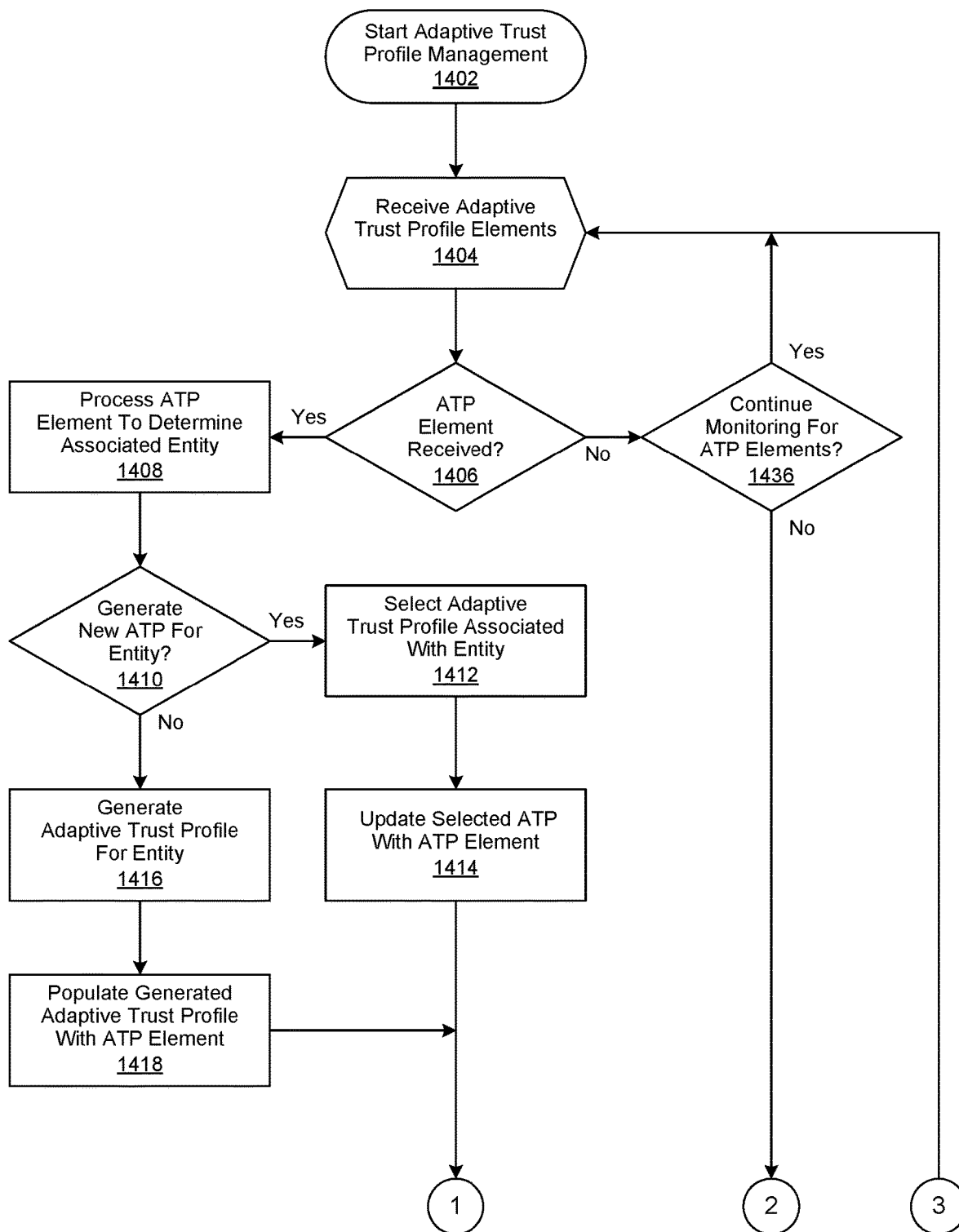
FIGS. 14a and 14b are a generalized flowchart of the performance of ATP definition and management operations.
Figure 14B:
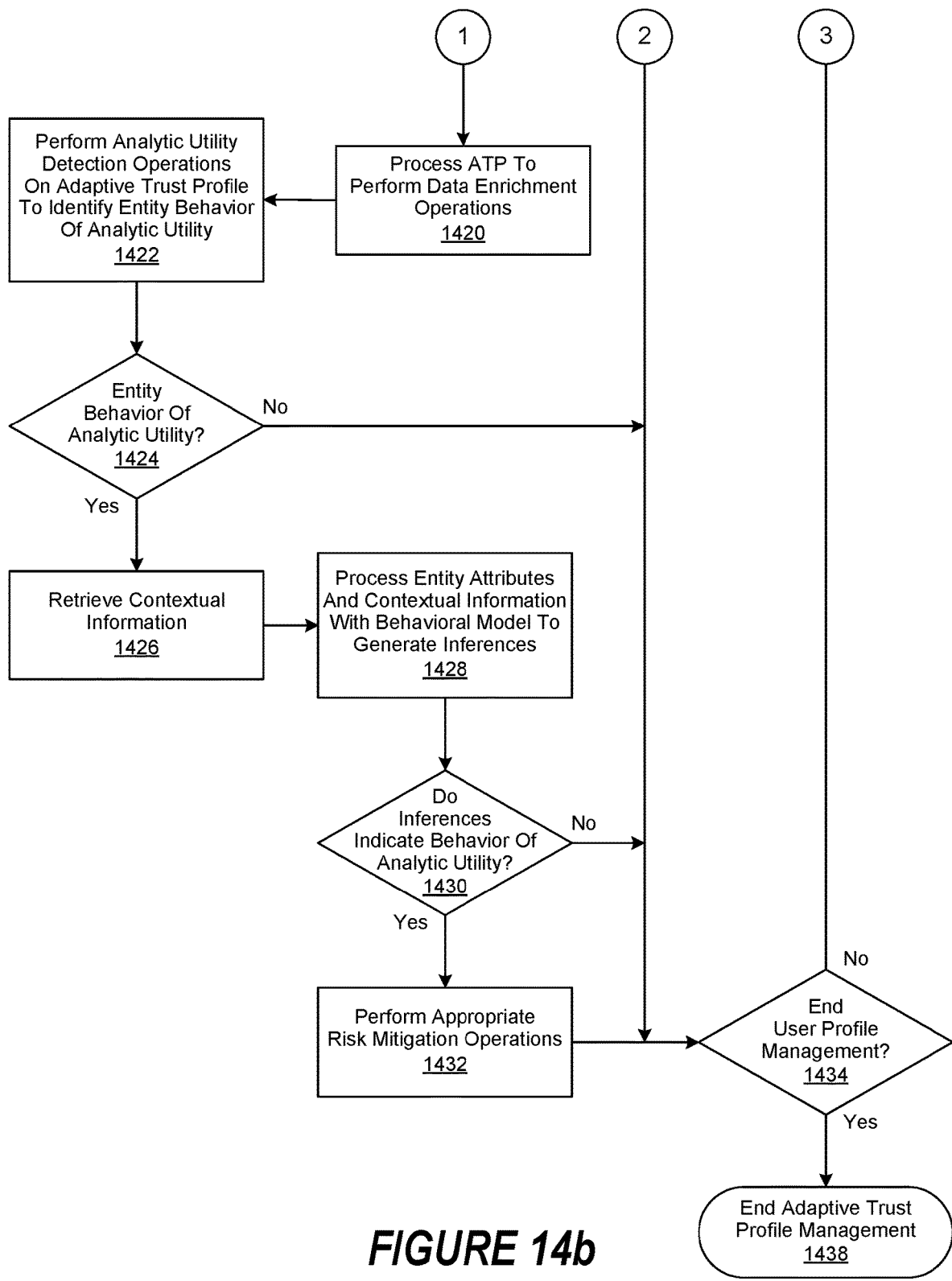

FIGS. 14*a* and 14*b* are a generalized flowchart of the performance of adaptive trust profile (ATP) definition and management operations implemented in accordance with an embodiment of the invention. In this embodiment, ATP definition and management operations are begun in step 1402, followed by ongoing operations being performed by an ATP system in step 1404 to ATP elements, as described in greater detail herein. A determination is then made in step 1406 whether an ATP element has been received by the ATP system.

If not, then a determination is made in step 1436 to determine whether to continue monitoring for ATP elements. If so, then the process is continued, proceeding with step 1404. Otherwise, a determination is made in step 1438 whether to end transportable cyberprofile generation operations. If not, then the process is continued, proceeding with step 1404. Otherwise, ATP definition and management operations are ended in step 1438.

However, if it was determined in step 1406 that an ATP element was received, then it is processed in step 1408 to determine its associated entity. A determination is then made in step 1410 whether to generate a new ATP for the entity. If not, then an ATP associated with the entity is selected in step 1412 and then updated with the ATP element in step 1414. However, if it was determined in step 1410 to generate a new ATP for the entity, then it is generated in step 1416 and populated with the ATP element in step 1418.

Thereafter, or after the selected ATP is updated in step 1414, the ATP is processed in step 1420 to perform data enrichment operations, described in greater detail herein. Analytic utility detection operations, likewise described in greater detail herein, are then performed on the enriched ATP in step 1422 to identify entity behavior that may be of analytic utility. Thereafter, a determination is made in step 1424 to determine whether the entity behavior is of analytic utility. If not, then a determination is made in step 1434 whether to continue ATP definition and management operations. If so, then the process is continued, proceeding with step 1404. Otherwise, ATP definition and management operations are ended in step 1438.

However, if it was determined in step 1424 that the entity behavior was of analytic utility, the contextual information is retrieved in step 1426 and then processed in step 1428 with entity attributes stored in the ATP with a behavioral model to generate one or more inferences, described in greater detail herein. A determination is then made in step 1430 whether the one or more inferences indicate behavior by the entity is of analytic utility. If not, the process is continued, proceeding with step 1434. Otherwise, appropriate risk mitigation operations are performed in step 1432 and the process is then continued, proceeding with step 1434.

Figure 15:
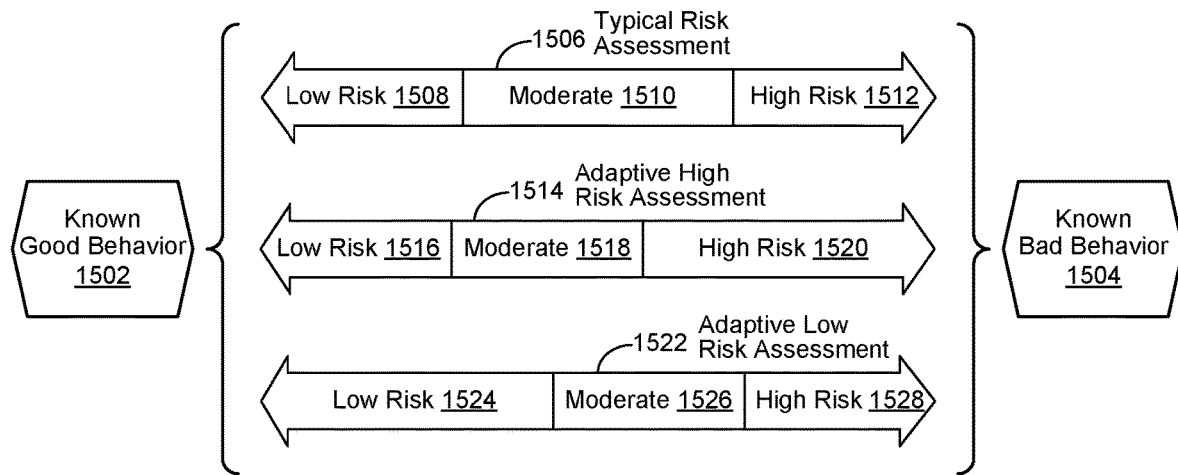
FIG. 15 is a simplified block diagram of a security analytics system implemented to adaptively assess risk associated with an entity behavior.

FIG. 15 is a simplified block diagram of the operation of a security analytics system implemented in accordance with an embodiment of the invention to adaptively assess risk associated with an entity behavior. In this embodiment, entity behavior is monitored and compared to known good behavior 1502 and known bad behavior 1504. In typical risk assessment 1506 approaches, low 1508, moderate 1510, or high 1512 risk entity behavior is generally determined by using fairly inflexible security policies, which are typically used to enact relatively static responses.

As an example, a security policy implemented for access control may have a list of actions a particular entity can do and a list of things they cannot. Ordinarily, the actions in those lists are static and don't change, regardless of the particular entity behavior being enacted. However, perhaps they should change, or adapt, if it is determined the entity behavior being enacted by the entity has changed, and as a result, represents a higher risk To continue the example, a user may be perusing various resources and happens to access a webpage, such as a shopping site, that contains certain objects. Typical security approaches assume some portion of those objects to be good, a small number are known to be bad, and the remainder suspicious. Consequently, there is a continuum of objects, some assumed to be good, some undetermined, and the rest known to be bad. It will be appreciated that the determination of what is considered to be good, undetermined, or bad is oftentimes fairly arbitrary.

In certain embodiments, contextual information associated with the entity behavior is collected and processed to adaptively respond to changes in the entity's current behavior. In continuation of the example, the user may change their behavior to access internal business resources. In this example, accessing internal business resources is contextual information that may represent the potential for higher risk. As a result, a risk-adaptive behavior system may be implemented in certain embodiments to respond with an adaptive high risk assessment 1514. In certain embodiments, the adaptive high risk assessment 1514 is generated by a security analytics system, described in greater detail herein. Consequently, the adaptive high risk assessment 1514 may indicate a larger percentage of certain entity behavior as high 1520 risk, and a smaller percentage as low 1516 or moderate 1518 risk.

In further continuance of the example, the user may further change their behavior to access an external news site. As before, the user's access of an external news site is contextual information that may represent the likelihood of lower risk. As a result, the risk-adaptive behavior system may be implemented to respond with an adaptive low risk assessment 1522, which may indicate a larger percentage of certain entity behavior as low 1524 risk, and a smaller percentage as moderate 1526 or high 1528 risk.

Certain embodiments of the invention reflect an appreciation that without the described adaptive behavior, the operational overhead administering entity security would be high, as all entity interactions related to their behavior would continue to be monitored. However, the cost of administering entity security would decrease when the entity was no longer interacting with internal resources. Consequently, risk tolerance can be dynamically adjusted according to the context of a given entity activity.

More particularly, if the entity's activity is primarily internal to the organization, then some risk can be tolerated. However, if the entity's activity is primarily external to the organization, then it is possible that essentially all risk can be tolerated. Furthermore, the user experience may be more pleasant during non-organization activities, as fewer security controls may be applied or experienced. Moreover, the risk assessment becomes dynamic, according to the identity of the entity, the resources being accessed, their respective behavior, and corresponding points of observation.

Figure 16:
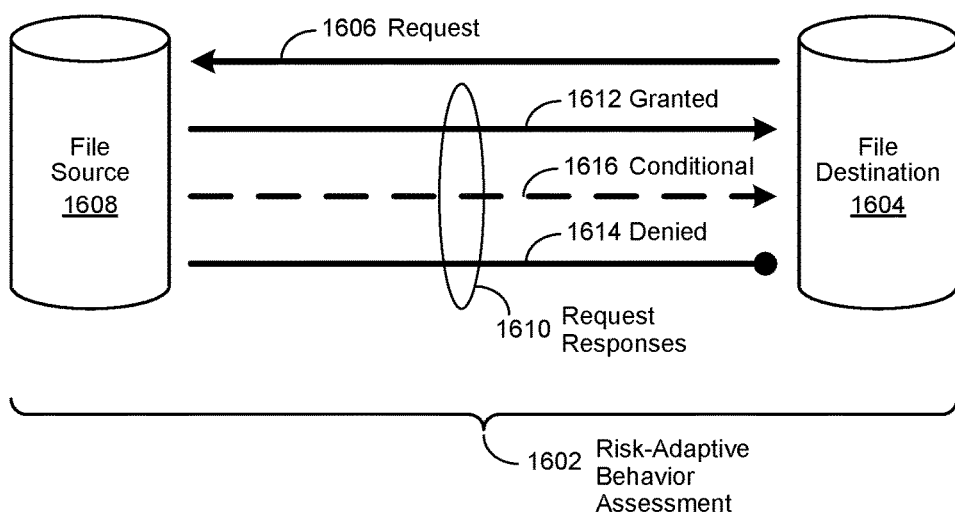
FIG. 16 is a simplified block diagram of the operation of a security analytics system to adaptively respond to an entity request.

FIG. 16 is a simplified block diagram of the operation of a security analytics system implemented in accordance with an embodiment of the invention to adaptively respond to an entity request. In this embodiment, an entity may place a request 1606 to download a file from a file source 1608 to a file destination 1604, such as a USB drive. In traditional security approaches, the owner of the requested file may have a single security rule, which would be a granted 1612, or denied 1614, request response 1610 as to whether the entity was allowed to download the file.

In certain embodiments, a risk-adaptive security policy may be implemented such that the entity's request 1606 to download the requested file is typically granted 1612. However, as an example, a user may have recently updated their online resume as well as begun to take random days off, which may imply a flight risk. By extension, the user behavior and other actions associated with the user may likewise imply the user's intent to take proprietary information with them to a new job. Consequently, various risk-adaptive behavior approaches may yield a denied 1614 request response 1610 due to the associated context of their behavior, other actions, or a combination thereof.

Alternatively, a risk-adaptive security policy may be implemented in various embodiments to provide a conditional 1616 request response 1610. As an example, a requested file may be encrypted such that it can only be opened on a corporate computer. Furthermore, attempting to open the file on a non-corporate computer may result in a message being sent to a security administrator. Likewise, a single file being downloaded may appear as good behavior, yet multiple sequential downloads may appear suspicious, especially if the files do not appear to be related, or possibly, if they do. From the foregoing, it will be appreciated that risk-adaptive behavior is not necessarily based upon an atomic action, but rather a multiplicity of factors, such as contextual information associated with particular entity behavior.

Figure 17:
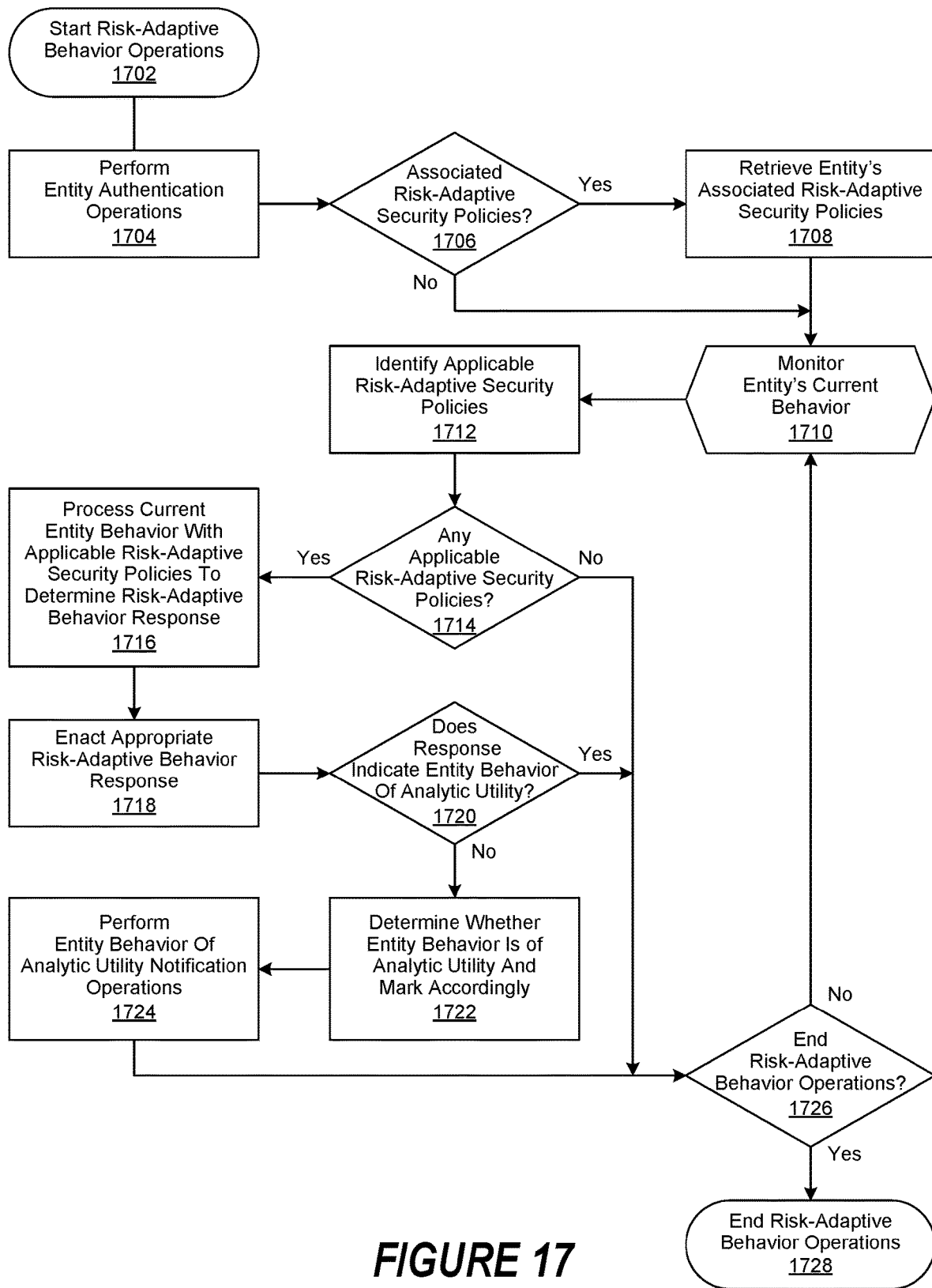
FIG. 17 is a generalized flowchart of the performance of security analytics system operations for adaptively managing entity behavior risk.

FIG. 17 is a generalized flowchart of the performance of security analytics system operations implemented in accordance with an embodiment of the invention to adaptively manage entity behavior risk. In this embodiment, risk-adaptive behavior operations are begun in step 1702, followed by the performance of entity authentication operations, familiar to those of skill in the art, in step 1704. A determination is then made in step 1706 whether the entity has one or more associated risk-adaptive security policies. If so, then they are retrieved for use in step 1708. Thereafter, or if it was determined in step 1706 the entity has no associated risk-adaptive security policies, the entity's behavior is monitored in step 1710.

The entity's current user behavior is then processed in step 1712 to identify any applicable risk-adaptive security policies that may apply. A determination is then made in step 1714 whether any applicable risk-adaptive security policies have been identified. If not, a determination is made in step 1726 whether to end risk-adaptive behavior system operations. If not, then the process is continued, proceeding with step 1710. Otherwise, risk-adaptive behavior system operations are ended in step 1728.

However, if it is determined in step 1714 that one or more applicable risk-adaptive security policies have been identified, then they are used in step 1716 to process the entity's current user behavior to determine an appropriate risk-adaptive behavior response. The appropriate risk-adaptive behavior response is then enacted in step 1718, followed by a determination being made in step 1720 whether the risk-adaptive behavior response enacted in step 1718 indicates acceptable user behavior.

If so, then the process is continued, proceeding with step 1726. Otherwise the entity's current behavior is determined to be of analytic utility and marked accordingly in step 1722. Entity behavior of analytic utility notification operations are then performed in step 1724. In one embodiment, entity behavior of analytic utility is stored for later review. In another embodiment, a security administrator is notified of the enactment of entity behavior of analytic utility. Thereafter, the process is continued, proceeding with step 1726.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for generating an adaptive trust profile, comprising:
monitoring a plurality of electronically-observable actions of an entity, the plurality of electronically-observable actions of the entity corresponding to a plurality of respective events enacted by the entity, the entity comprising a user entity;
converting the plurality of electronically-observable actions of the entity to electronic information representing the plurality of actions of the entity;
generating the adaptive trust profile based upon the plurality of actions of the entity, the adaptive trust profile being generated by an adaptive trust profile system, the adaptive trust profile system executing on a hardware processor of an information handling system, the adaptive trust profile comprising a plurality of adaptive trust profile components;
generating, via the adaptive trust profile system, contextual information about an event enacted by the entity, the contextual information comprising information relating to a particular entity behavior;
deriving, via the adaptive trust profile system, a meaning from the contextual information associated with the event, the meaning including an inference of an intent of the entity associated with the event;
updating, via the adaptive trust profile system, at least one of the plurality of adaptive trust profile components based upon the contextual information about the event and the intent of the entity associated with the event;
detecting entity behavior of analytic utility using the adaptive trust profile; and,
adaptively responding to the entity behavior of analytic utility to mitigate a security risk.

2. The method of claim 1, wherein:
the plurality of adaptive trust profile components comprise an entity state component.

3. The method of claim 2, wherein:
the entity state component comprises at least one of a long-term entity state and a short-term entity state, the long-term entity state reflecting a state of the entity at recurring points in time, the short-term entity state reflecting the state of the entity at a particular point in time.

4. The method of claim 1, wherein:
the plurality of adaptive trust profile components comprise an entity attribute component.

5. The method of claim 1, wherein:
the plurality of adaptive trust profile components comprise a behavioral model component.

6. The method of claim 1, wherein:
the plurality of adaptive trust profile components comprise an inferences component.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
 monitoring a plurality of electronically-observable actions of an entity, the plurality of electronically-observable actions of the entity corresponding to a plurality of respective events enacted by the entity, the entity comprising a user entity;
 converting the plurality of electronically-observable actions of the entity to electronic information representing the plurality of actions of the entity;
 generating the adaptive trust profile based upon the plurality of actions of the entity, the adaptive trust profile comprising a plurality of adaptive trust profile components;
 generating, via the adaptive trust profile system, contextual information about an event enacted by the entity, the contextual information comprising information relating to a particular entity behavior;
 deriving, via the adaptive trust profile system, a meaning from the contextual information associated with the event, the meaning including an inference of an intent of the entity associated with the event;
 updating, via the adaptive trust profile system, at least one of the plurality of adaptive trust profile components based upon the contextual information about the event and the intent of the entity associated with the event; and,
 detecting entity behavior of analytic utility using the adaptive trust profile; and,
 adaptively responding to the entity behavior of analytic utility to mitigate a security risk.

8. The system of claim 7, wherein:
the plurality of adaptive trust profile components comprise an entity state component.

9. The system of claim 8, wherein:
the entity state component comprises at least one of a long-term entity state and a short-term entity state, the long-term entity state reflecting a state of the entity at recurring points in time, the short-term entity state reflecting the state of the entity at a particular point in time.

10. The system of claim 7, wherein:
the plurality of adaptive trust profile components comprise an entity attribute component.

11. The system of claim 7, wherein:
the plurality of adaptive trust profile components comprise a behavioral model component.

12. The system of claim 7, wherein:
the plurality of adaptive trust profile components comprise an inferences component.

13. A non-transitory, computer-readable storage medium embodying computer program code, the computer program code comprising computer executable instructions configured for:
 monitoring a plurality of electronically-observable actions of an entity, the plurality of electronically-observable actions of the entity corresponding to a plurality of respective events enacted by the entity, the entity comprising a user entity;
 converting the plurality of electronically-observable actions of the entity to electronic information representing the plurality of actions of the entity;
 generating the adaptive trust profile based upon the plurality of actions of the entity, the adaptive trust profile comprising a plurality of adaptive trust profile components;
 generating, via the adaptive trust profile system, contextual information about an event enacted by the entity, the contextual information comprising information relating to a particular entity behavior;
 deriving, via the adaptive trust profile system, a meaning from the contextual information associated with the event, the meaning including an inference of an intent of the entity associated with the event;
 updating, via the adaptive trust profile system, at least one of the plurality of adaptive trust profile components based upon the contextual information about the event and the intent of the entity associated with the event; and,
 detecting entity behavior of analytic utility using the adaptive trust profile; and,
 adaptively responding to the entity behavior of analytic utility to mitigate a security risk.

14. The non-transitory, computer-readable storage medium of claim 13, wherein:
the plurality of adaptive trust profile components comprise an entity state component.

15. The non-transitory, computer-readable storage medium of claim 14, wherein:
the entity state component comprises at least one of a long-term entity state and a short-term entity state, the long-term entity state reflecting a state of the entity at recurring points in time, the short-term entity state reflecting the state of the entity at a particular point in time.

16. The non-transitory, computer-readable storage medium of claim 13, wherein:
the plurality of adaptive trust profile components comprise an entity attribute component.

17. The non-transitory, computer-readable storage medium of claim 13, wherein:
the plurality of adaptive trust profile components comprise a behavioral model component.

18. The non-transitory, computer-readable storage medium of claim 13, wherein:
the plurality of adaptive trust profile components comprise an inferences component.

19. The non-transitory, computer-readable storage medium of claim 13, wherein:
the computer executable instructions are deployable to a client system from a server system at a remote location.

20. The non-transitory, computer-readable storage medium of claim 13, wherein:

the computer executable instructions are provided by a service provider to a user on an on-demand basis.

* * * * *